US010800225B2

(12) United States Patent
Arai et al.

(10) Patent No.: US 10,800,225 B2
(45) Date of Patent: Oct. 13, 2020

(54) WORKING VEHICLE

(71) Applicant: Komatsu Ltd., Tokyo (JP)

(72) Inventors: Yuki Arai, Tokyo (JP); Hirokazu Ashikawa, Tokyo (JP); Tomoyuki Moriyama, Tokyo (JP); Satoshi Matsumoto, Tokyo (JP)

(73) Assignee: KOMATSU LTD., Tokyo (JP)

( * ) Notice: Subject to any disclaimer, the term of this patent is extended or adjusted under 35 U.S.C. 154(b) by 517 days.

(21) Appl. No.: 15/505,377

(22) PCT Filed: Aug. 3, 2016

(86) PCT No.: PCT/JP2016/072752
§ 371 (c)(1),
(2) Date: Feb. 21, 2017

(87) PCT Pub. No.: WO2018/025340
PCT Pub. Date: Feb. 8, 2018

(65) Prior Publication Data
US 2018/0215232 A1 Aug. 2, 2018

(51) Int. Cl.
*B60H 1/00* (2006.01)
*B60K 13/04* (2006.01)
(Continued)

(52) U.S. Cl.
CPC .......... *B60H 1/00457* (2013.01); *B60K 11/04* (2013.01); *B60K 11/06* (2013.01);
(Continued)

(58) Field of Classification Search
CPC .... B60H 1/00457; B60K 13/04; B60K 11/04; B60K 11/06; F01N 13/009;
(Continued)

(56) References Cited

U.S. PATENT DOCUMENTS 3,820,327 A    6/1974  Henault
5,816,351 A *  10/1998 Akira ..................... B60K 11/08
                                                180/68.1

(Continued)

FOREIGN PATENT DOCUMENTS

CN      101835963 A      9/2010
CN      104185723 A     12/2014
(Continued)

OTHER PUBLICATIONS

International Search Report dated Oct. 11, 2016, issued for PCT/JP2016/072752.
(Continued)

*Primary Examiner* — Edelmira Bosques
*Assistant Examiner* — Dana K Tighe
(74) *Attorney, Agent, or Firm* — Locke Lord LLP

(57) ABSTRACT

A working vehicle includes an engine, an air blowing device, an exhaust gas post-processing device, and a guide device. The air blowing device is disposed in front of the engine. The exhaust gas post-processing device processes exhaust gas from the engine, and is disposed above the engine. The guide device lifts and guides at least portion of the air from the air blowing device to an upper side where the exhaust gas post-processing device is provided.

9 Claims, 15 Drawing Sheets

(51) Int. Cl.
    *F01N 3/24*         (2006.01)
    *B60K 11/06*       (2006.01)
    *F01N 3/10*         (2006.01)
    *F01N 9/00*         (2006.01)
    *B60K 11/04*       (2006.01)
    *F01N 3/021*       (2006.01)
    *F01N 3/28*         (2006.01)
    *F01N 13/00*       (2010.01)
    *F01N 3/20*         (2006.01)
    *F01N 13/18*       (2010.01)
    *B60P 1/04*         (2006.01)
    *F01N 3/035*       (2006.01)

(52) U.S. Cl.
    CPC .............. *B60K 13/04* (2013.01); *F01N 3/021* (2013.01); *F01N 3/106* (2013.01); *F01N 3/2066* (2013.01); *F01N 3/24* (2013.01); *F01N 3/2892* (2013.01); *F01N 9/00* (2013.01); *F01N 13/009* (2014.06); *F01N 13/1822* (2013.01); *B60H 1/00564* (2013.01); *B60P 1/04* (2013.01); *B60Y 2200/41* (2013.01); *F01N 3/035* (2013.01); *F01N 2240/20* (2013.01); *F01N 2340/04* (2013.01); *F01N 2560/026* (2013.01); *F01N 2560/08* (2013.01); *F01N 2590/08* (2013.01); *F01N 2610/02* (2013.01); *F01N 2610/1406* (2013.01); *F01N 2610/1453* (2013.01); *Y02A 50/20* (2018.01); *Y02T 10/12* (2013.01); *Y02T 10/40* (2013.01)

(58) Field of Classification Search
    CPC ...... F01N 13/1822; F01N 3/021; F01N 3/106; F01N 3/2066; F01N 3/24; F01N 3/2892; F01N 9/00
    USPC .......................................................... 454/152
    See application file for complete search history.

(56) References Cited

U.S. PATENT DOCUMENTS

| | | | | |
|---|---|---|---|---|
| 6,192,839 B1* | 2/2001 | Takeshita | ............ | E02F 9/0866 123/41.49 |
| 6,622,668 B2* | 9/2003 | Izumi | ........................ | E02F 9/00 123/41.49 |
| 7,828,097 B2* | 11/2010 | Kondou | ................. | B60K 11/02 180/68.1 |
| 8,407,991 B2 | 4/2013 | Yokota | | |
| 8,827,021 B1* | 9/2014 | Nakagami | ............ | E02F 9/0891 180/309 |
| 8,827,029 B1* | 9/2014 | Nakagami | ............ | E02F 9/0866 180/296 |
| 8,857,384 B2 | 10/2014 | Yotsuzuka | | |
| 8,899,017 B2* | 12/2014 | Himoto | ................. | F01N 3/2066 60/282 |
| 8,919,488 B2* | 12/2014 | Shiraishi | ............... | E02F 9/0866 180/311 |
| 9,016,428 B2 | 4/2015 | Numa | | |
| 9,056,547 B2* | 6/2015 | Kimijima | ............ | E02F 3/3411 |
| 9,073,581 B2* | 7/2015 | Aoyama | ................ | B60K 13/04 |
| 9,157,214 B2* | 10/2015 | Tsumura | ............... | E02F 3/7609 |
| 9,238,901 B2* | 1/2016 | Kamimae | ............. | B60K 13/04 |
| 9,394,668 B2* | 7/2016 | Sakai | .................... | E02F 3/7631 |
| 9,518,373 B1* | 12/2016 | Ueda | ..................... | E02F 9/0866 |
| 2001/0007292 A1* | 7/2001 | Yabf | ...................... | E02F 9/0866 180/68.1 |
| 2006/0144350 A1* | 7/2006 | Nakashima | ............ | B60K 11/08 123/41.01 |
| 2008/0041332 A1* | 2/2008 | Sakitani | ................. | B60K 11/00 123/198 E |
| 2008/0178825 A1* | 7/2008 | Mitchell | ................... | F01P 1/06 123/41.56 |
| 2010/0218488 A1 | 9/2010 | Yokota | | |
| 2010/0219008 A1* | 9/2010 | Isaka | ...................... | B60K 11/04 180/68.1 |
| 2010/0275588 A1* | 11/2010 | Kamata | ................ | B60K 5/1208 60/322 |
| 2011/0088637 A1* | 4/2011 | Hirasawa | ............... | B60K 11/04 123/41.31 |
| 2011/0214931 A1* | 9/2011 | Nakashima | ........... | B60K 11/08 180/68.1 |
| 2012/0079810 A1* | 4/2012 | Abe | ........................ | F01N 3/005 60/272 |
| 2012/0247861 A1* | 10/2012 | Mizuno | .................. | B60K 13/04 180/296 |
| 2013/0319787 A1* | 12/2013 | Kobayashi | ............ | E02F 9/0866 180/309 |
| 2014/0124284 A1* | 5/2014 | Sekiya | ................... | B60K 13/04 180/309 |
| 2014/0290222 A1 | 10/2014 | Sawada et al. | | |
| 2014/0291059 A1 | 10/2014 | Numa | | |
| 2014/0292033 A1* | 10/2014 | Nakagami | ............ | E02F 9/0891 296/190.08 |
| 2014/0318882 A1* | 10/2014 | Sawada | .................. | B60K 13/04 180/309 |
| 2015/0000256 A1* | 1/2015 | Kobayashi | ................ | F01N 3/10 60/282 |
| 2015/0078967 A1 | 3/2015 | Nakagami et al. | | |
| 2016/0257194 A1 | 9/2016 | Ashikawa et al. | | |
| 2016/0356018 A1* | 12/2016 | Tabuchi | ..................... | F01P 5/06 |

FOREIGN PATENT DOCUMENTS

| | | |
|---|---|---|
| JP | 2011-126488 A | 6/2011 |
| JP | 2013-138628 A | 7/2013 |
| JP | 2013-176342 A | 9/2013 |
| JP | 2013-233087 A | 11/2013 |
| JP | 2014-181718 A | 9/2014 |
| JP | 2016-043880 A | 4/2016 |
| WO | 2012/105320 A1 | 8/2012 |
| WO | 2015/129121 A1 | 9/2015 |

OTHER PUBLICATIONS

Office Action dated Dec. 27, 2017, issued for the corresponding Canadian patent application No. 2,958,965.

* cited by examiner

WORKING VEHICLE

FIELD

The present invention relates to a working vehicle.

BACKGROUND

A working vehicle such as a dump truck includes an engine such as a diesel engine. A particulate substance and a nitrogen oxide are included in exhaust gas discharged from the engine. There are some working vehicles that include an exhaust gas post-processing device that removes the particulate substance and the nitrogen oxide included in the exhaust gas (for example, see Patent Literature 1).

A dump truck described in Patent Literature 1 has a diesel particulate filter (hereinafter referred to as "DPF") device and a selective catalytic reduction (hereinafter referred to as "SCR") device. The DPF device has a filter capable of collecting the particulate substance. The SCR device has a catalyst for decomposing the nitrogen oxide. A mixing device that mixes urea water, which serves as a reducing agent (ammonia) in the SCR device, with the exhaust gas is disposed between the DPF device and the SCR device. In addition, various sensors that detect the states of the inside and outside of the devices are mounted on the DPF device and the SCR device.

CITATION LIST

Patent Literature

Patent Literature 1: WO 2015/129121 A

SUMMARY

Technical Problem

In an exhaust gas post-processing device, temperatures of a DPF device, a mixing device, and a SCR device each become high when the exhaust gas is post-processed. Therefore, a sensor provided in each device and urea water or the like supplied to the mixing device may be influenced by the heat.

An aspect of the present invention has an object to provide a working vehicle capable of reducing the influence of heat in the exhaust gas post-processing device.

Solution to Problem

According to a first aspect of the present invention, a working vehicle comprises: an engine; an air blowing device disposed in front of the engine; an exhaust gas post-processing device that processes exhaust gas from the engine, and is disposed above the engine; and a guide device that lifts and guides at least portion of air from the air blowing device to an upper side in which the exhaust gas post-processing device is provided.

Advantageous Effects of Invention

According to an aspect of the present invention, the influence of heat in an exhaust gas post-processing device can be reduced.

DESCRIPTION OF EMBODIMENTS

Figure 1:
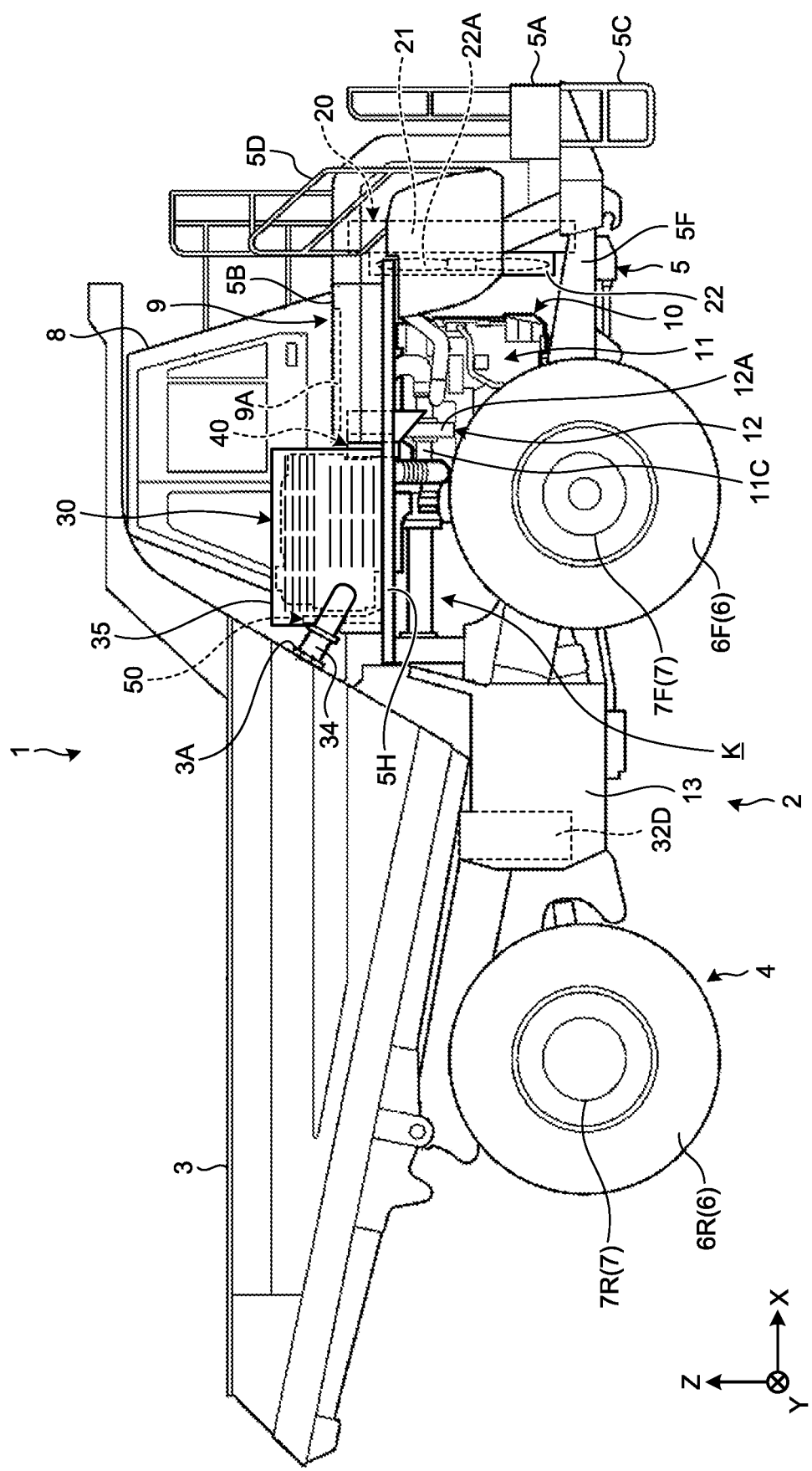
FIG. 1 is a side view illustrating a working vehicle according to the present embodiment.

In the following, an embodiment of a working vehicle according to the present invention will be described with reference to the drawings. The present invention is not limited by the present embodiment. In addition, components in the following embodiment include components that a person skilled in the art can easily replace, or that are substantially identical. The components of the embodiment described below can optionally be combined. Furthermore, there may be a case where some of the components are not used.

In the following description, an XYZ orthogonal coordinate system is set, and a positional relationship among respective portions will be described with reference to the XYZ orthogonal coordinate system. A direction parallel to a first axis in a predetermined plane is referred to as an X axis direction. In addition, a direction parallel to a second axis in the predetermined plane orthogonal to the first axis is referred to as a Y axis direction. Furthermore, a direction parallel to a third axis orthogonal to the predetermined plane is referred to as a Z axis direction. In the X axis direction, the Y axis direction, and the Z axis direction, the description is made by referring to a direction of an arrow in the drawing as a +direction, and a direction opposite to the direction of the arrow as a −direction. Note that, in the present embodiment, the description of directions is made by referring to a +side of the X axis as a front side, a −side of the X axis as a rear side, a +side of the Y axis as a left side, a −side of the Y axis as a right side, a +side of the Z axis as an upper side, and a −side of the Z axis as a lower side.

[Working Vehicle]

FIG. 1 is a side view illustrating a working vehicle 1 according to the present embodiment. In the present embodiment, the working vehicle 1 is, for example, a dump truck that transports a cargo, such as soil and crushed stones, in a mining site of a mine. In the following description, the working vehicle 1 is referred to as a dump truck 1. Note that, in the present embodiment, the dump truck 1 is a manned dump truck operated by a driver (operator) boarded on a cab (operating room) 8; however, the dump truck 1 is not limited to this. Furthermore, in the present embodiment, the dump truck 1 is, for example, a rigid type dump truck 1; however, the dump truck 1 is not limited to this.

In the present embodiment, for convenience, a front-rear direction of the dump truck 1 is referred to as the X axis direction. A seat on which the operator sits and a handle operated by the operator are provided in the cab 8. In the present embodiment, a direction in which the handle is provided with respect to the seat is referred to as a front side. That is, a direction in which the cab 8 is provided with respect to a vessel 3 is referred to as a front side, and a direction in which the vessel 3 is provided with respect to the cab 8 is referred to as a rear side. The +X direction indicates the front side, and the −X direction indicates the rear side. The Y axis direction indicates a vehicle width direction of a vehicle main body 2 of the dump truck 1. The +Y direction indicates the left direction in a forward direction of the dump truck 1, and the −Y direction indicates the right direction in the forward direction of the dump truck 1. The Z axis direction indicates a vertical direction of the dump truck 1. In the present embodiment, a direction in which the vehicle main body 2 or the vessel 3 is provided with respect to a ground contact surface, which is where a wheel 6 comes into contact with the ground, is an upper side, and a direction from the vehicle main body 2 or the vessel 3 to the ground contact surface, that is, a gravity direction, is a lower side. The +Z direction indicates the upper side, and the −Z direction indicates the lower side.

The dump truck 1 includes the vehicle main body 2, and the vessel 3 provided on the vehicle main body 2. The vehicle main body 2 has a traveling device 4, and a vehicle body 5 supported by the traveling device 4. The traveling device 4 has the wheel 6, and an axle 7 that rotatably supports the wheel 6. The wheel 6 includes a front wheel 6F and a rear wheel 6R. The axle 7 includes an axle 7F that rotatably supports the front wheel 6F, and an axle 7R that rotatably supports the rear wheel 6R.

The vehicle body 5 has a lower deck 5A, an upper deck 5B, ladders 5C and 5D, and a main frame 5F. The lower deck 5A is disposed at a lower front portion of the vehicle body 5. The upper deck 5B is disposed above (+Z side) the lower deck 5A in the front portion of the vehicle body 5. The ladder 5C is disposed below (−Z side) the lower deck 5A. The ladder 5D is disposed between the lower deck 5A and the upper deck 5B. The main frame 5F is disposed along the front-rear direction (X axis direction).

The vehicle body 5 has the cab 8. The cab 8 is disposed on the upper deck 5B. The operator can get on and get off from the upper deck 5B using the ladder 5C. The operator can move between the lower deck 5A and the upper deck 5B using the ladder 5D. The operator operates the dump truck 1 by boarding on the cab 8.

The vehicle body 5 has a platform 9. The platform 9 is disposed at a side of the cab 8 in the upper deck 5B. The platform 9 has an inspection port 9A that has an opening/closing door. The inspection port 9A leads into an engine room in which an engine 11 is disposed.

Figure 2:
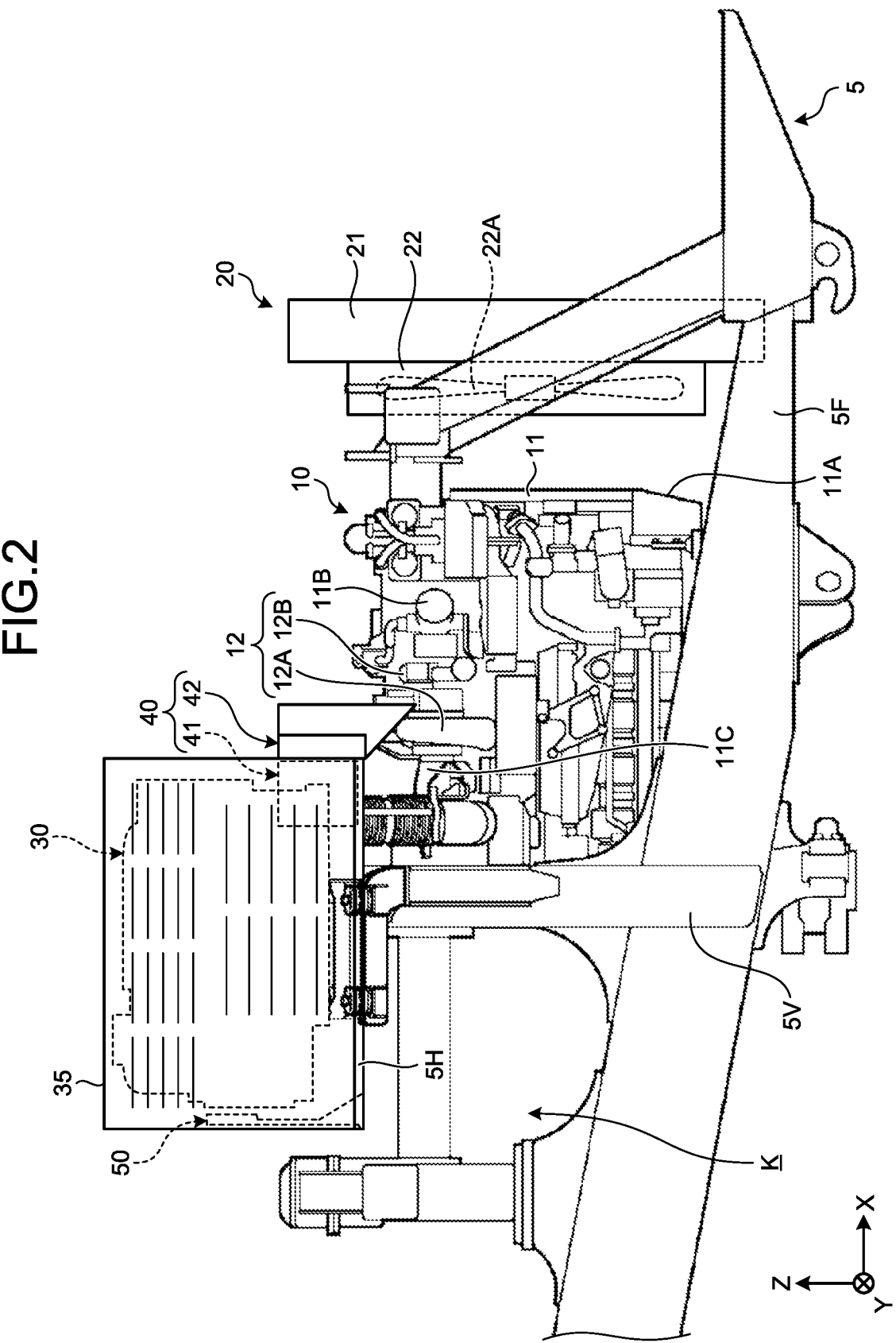
FIG. 2 is a side view illustrating a configuration of a power generation device and the vicinity thereof.

As illustrated in FIG. 1 or 2, the vehicle body 5 has a space portion K. The space portion K is disposed between the engine 11 and an exhaust gas post-processing device 30. Specifically, the space portion K is disposed below (−Z side) the exhaust gas post-processing device 30.

The vessel 3 is a structure on which the cargo is loaded. The vessel 3 can be elevated and lowered vertically with respect to the vehicle main body 2 by an elevating/lowering device. The elevating/lowering device includes an actuator, such as a hydraulic cylinder (hoist cylinder), disposed between the vessel 3 and the vehicle body 5. The cargo on the vessel 3 is discharged by the elevation of the vessel 3 by the elevating/lowering device.

[Power Generation Device]

FIG. 2 is a side view illustrating a configuration of a power generation device 10 and the vicinity thereof in the dump truck 1. As illustrated in FIGS. 1 and 2, the vehicle body 5 has the power generation device 10. The power generation device 10 generates power to drive the traveling device 4. The power generation device 10 has the engine 11 and, for example, a supercharger 12. In the present embodiment, the engine 11 is a diesel engine. The engine 11 has a main body portion 11A, an intake pipe 11B, and an exhaust pipe 11C. The main body portion 11A is supported by the main frame 5F. The gas supplied to the main body portion 11A flows through the intake pipe 11B. The exhaust gas discharged from the main body portion 11A flows through the exhaust pipe 11C. The exhaust pipe 11C is connected to a DPF device 31 of the exhaust gas post-processing device 30 (see FIG. 3).

The power generation device 10 has the supercharger 12. The supercharger 12 has an exhaust turbine 12A and a compressor 12B. The exhaust turbine 12A is provided in the exhaust pipe 11C. The exhaust turbine 12A is rotatable by the exhaust gas that flows through the exhaust pipe 11C. The compressor 12B is provided in the intake pipe 11B. The compressor 12B is rotatable integrally with the exhaust turbine 12A. The exhaust turbine 12A and the compressor 12B are disposed side by side in the X axis direction. In the present embodiment, the exhaust turbine 12A is disposed at the −X side (rear side) in the X axis direction, and the compressor 12B is disposed at the front side (+X side) therein.

[Cooling Device]

The vehicle body 5 has a cooling device 20. The cooling device 20 is disposed at the +X side, that is, at the front, of the engine 11. The cooling device 20 has a radiator 21 and an air blowing device 22. The radiator 21 is disposed at the +X side, that is, at the front portion, of the vehicle body 5. The radiator 21 radiates heat from the engine 11 and cools the engine 11 by using cooling water supplied to the engine 11. The air blowing device 22 is disposed behind (−X side) the radiator 21. In the present embodiment, the air blowing device 22 has a fan 22A. The fan 22A sends air toward the rear side (−X direction). By rotating the fan 22A, the air blowing device 22, for example, causes the air to be sucked from the front side (+X side) of the radiator 21 into the radiator 21 and then, causes the air that has passed through the radiator 21 to be sent to the rear side (−X direction).

[Exhaust Gas Post-processing Device]

Figure 3:
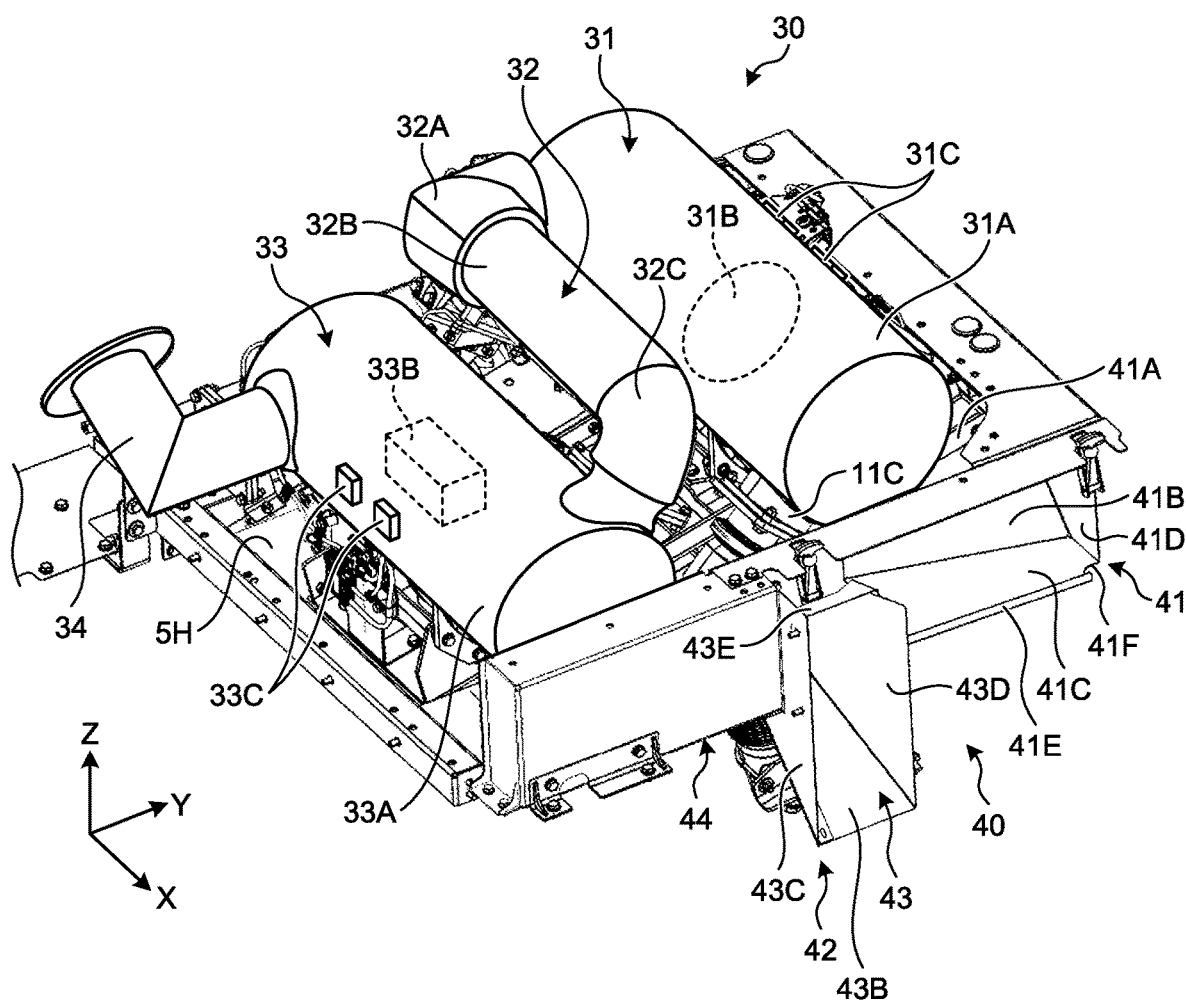
FIG. 3 is a perspective view illustrating an example of an exhaust gas post-processing device.
Figure 4:
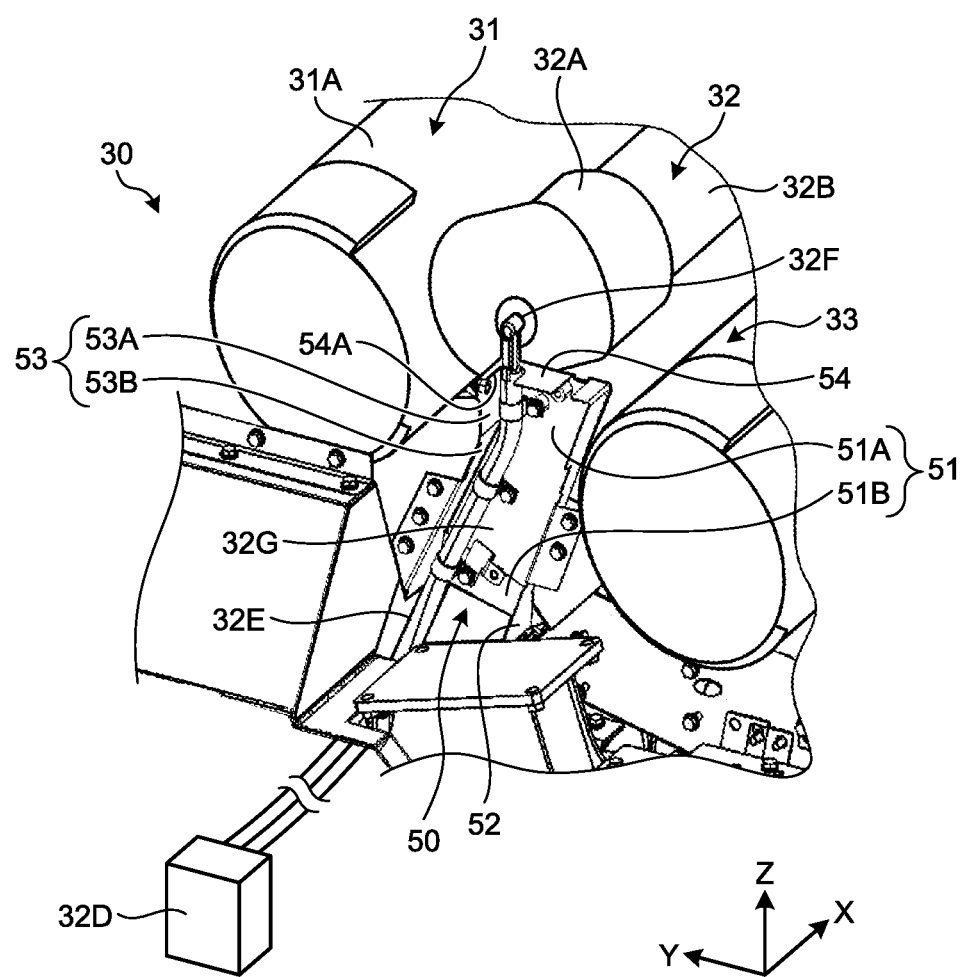
FIG. 4 is a perspective view illustrating an example of the exhaust gas post-processing device.

The vehicle body 5 has the exhaust gas post-processing device 30. FIGS. 3 and 4 are perspective views illustrating examples of the exhaust gas post-processing device 30. FIG. 3 illustrates a configuration of the front side of the dump truck 1, that is, as viewed from the +X side thereof. FIG. 4 illustrates a partial configuration of the rear side of the dump truck 1, that is, as viewed from the −X side thereof. The exhaust gas post-processing device 30 is disposed at a right side of the cab 8 (right side with respect to the front of the dump truck 1). The exhaust gas post-processing device 30 is a device that purifies the exhaust gas discharged from the engine 11 to the exhaust pipe 11C. The exhaust gas post-processing device 30, for example, removes fine particles such as soot included in the exhaust gas, and reduces the nitrogen oxide (NOx) in the exhaust gas.

The exhaust gas post-processing device 30 has the DPF device 31, a mixing device 32, and a SCR device 33. The DPF device 31 removes the fine particles such as soot in the exhaust gas. The DPF device 31 has a container (first container) 31A, a filter 31B, and various sensors (first detecting unit) 31C. The container 31A is, for example, a cylindrical shape. The container 31A is disposed so that an axial direction thereof extends along the front-rear direction (X axis direction) of the dump truck 1. The container 31A is connected to the exhaust pipe 11C. The container 31A flows the exhaust gas, which flows in from the exhaust pipe 11C, to the rear side (−X side). The filter 31B is disposed inside the container 31A, and collects the fine particles in the exhaust gas that flows inside the container 31A.

The sensor 31C is disposed on an outer surface of the container 31A. The sensor 31C, for example, detects a state of the inside of the container 31A. The sensor 31C includes, for example, a temperature sensor and a differential pressure sensor. The temperature sensors are each disposed at an upstream side (+X side) and a downstream side (−X side) of the filter 31B in a flow direction of the exhaust gas. The temperature sensors detect the temperature in the upstream side of the filter 31B and the temperature in the downstream side of the filter 31B. The differential pressure sensors are each disposed at the upstream side and the downstream side of the filter 31B in the flow direction of the exhaust gas. The differential pressure sensors detect the deposition amount of fine particles collected in the filter 31B by detecting the differential pressure between the upstream side and the downstream side of the filter 31B in the flow direction of the exhaust gas. A value of the differential pressure detected by the differential pressure sensor increases as the deposition amount of the fine particles gets larger. The sensor 31A is disposed on a portion of the outer surface of the container 31A so as not to face a container 33A. For example, the sensor 31C is disposed at a position on the +Y side (left side with respect to the front of the dump truck 1) in the outer surface of the container 31A. The sensor 31C is connected to a control device (not illustrated) via wiring, a connector, and the like. Note that the sensor 31C may be a sensor that detects a state of the outside of the container 31A.

The mixing device 32 mixes urea water that is a reducing agent with the exhaust gas discharged from the DPF device 31, and sends it to the SCR device 33. In the mixing device 32, the mixed urea water is hydrolyzed and thus, ammonia is generated. The exhaust gas and the ammonia that has been generated are sent to the SCR device.

The mixing device 32 has an upstream side elbow pipe 32A, a straight pipe 32B, a downstream side elbow pipe 32C, a urea water tank 32D (see FIGS. 1 and 4), a supply pipe 32E (see FIG. 4), and an injector 32F (see FIG. 4).

The upstream side elbow pipe 32A is connected to a side portion of the container 31A of the DPF device 31. The upstream side elbow pipe 32A is protruded from the container 31A to the side, and is bent toward the front side (+X side). The straight pipe 32B is connected to the upstream side elbow pipe 32A and the downstream side elbow pipe 32C. The straight pipe 32B is disposed linearly along the front-rear direction (X axis direction) of the dump truck 1. The downstream side elbow pipe 32C is protruded from the straight pipe 32B to the front side (+X side), and is bent to the side toward the SCR device 33. A tip of a portion bent to the side in the downstream side elbow pipe 32C is connected to the SCR device 33.

The urea water tank 32D is disposed in the vicinity of a fuel tank 13 (see FIG. 1). The urea water tank 32D stores the urea water supplied to the mixing device 32. An injection port of the urea water tank 32D is, similar to an injection port of the fuel tank 13, disposed at a position outside of the dump truck 1 and accessible from a section near the ground. Therefore, replenishment or the like of the urea water for the urea water tank 32D can be efficiently performed.

The supply pipe 32E connects the urea water tank 32D and the injector 32F. The supply pipe 32E is a pipe for flowing the urea water supplied from the urea water tank 32D to the injector 32F. A surface of the supply pipe 32E is covered with a heat insulation cover. The transmission of the heat radiated from the DPF device 31, the mixing device 32, and the SCR device 33 can be suppressed by the heat insulation cover.

Figure 18:
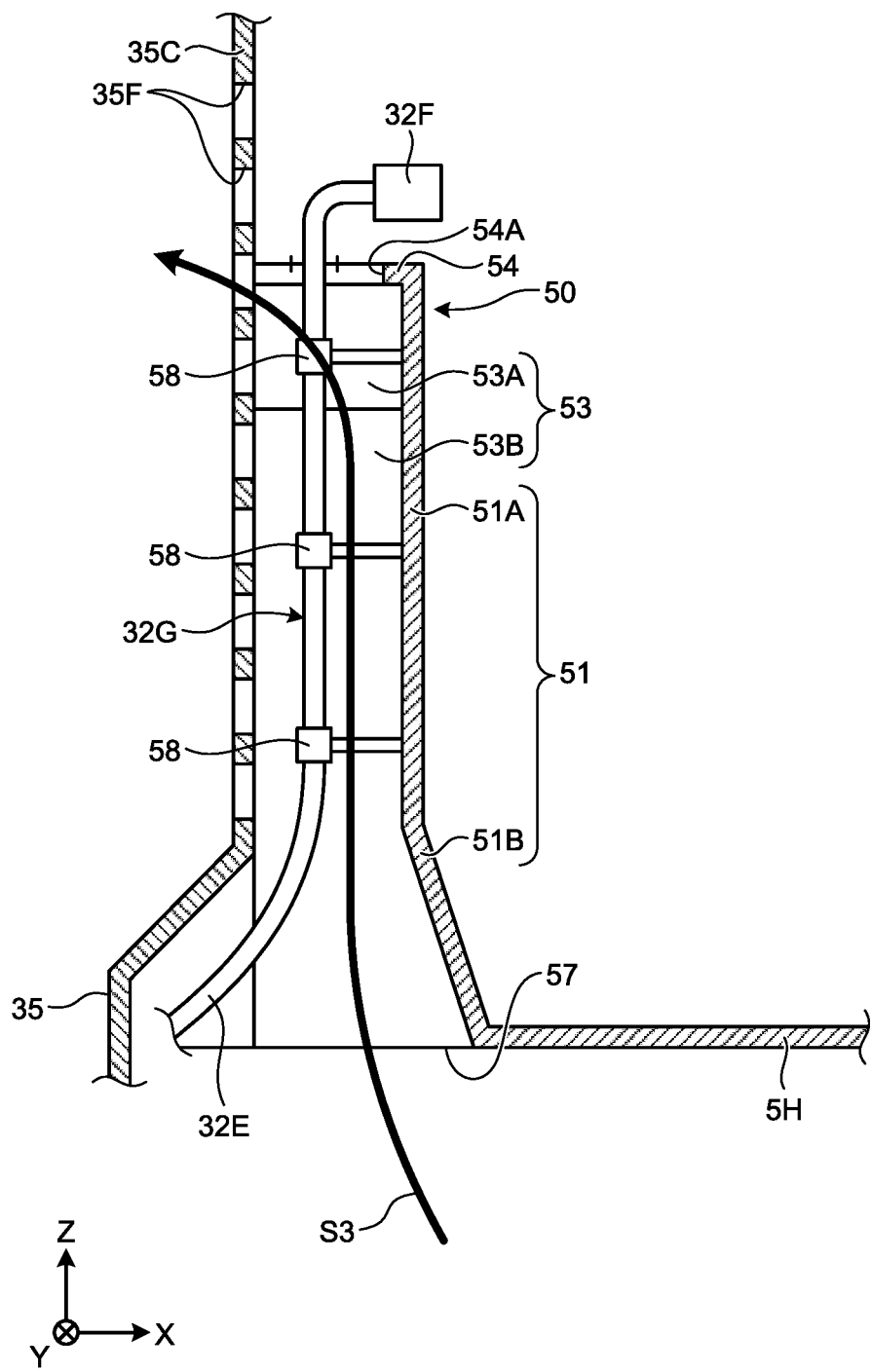
FIG. 18 is a view illustrating the flow of air led by the second guide member.

A portion of the supply pipe 32E is disposed in a container-between portion 32G (see, for example, FIG. 18). The container-between portion 32G is a portion including the supply pipe 32E disposed between the container 31A of the DPF device 31 and the container 33A of the SCR device 33 described later. The container-between portion 32G includes an end portion of the supply pipe 32E connected to the injector 32F. The container-between portion 32G is, for example, disposed at a rear portion (end portion at the −X side) of the exhaust gas post-processing device 30.

The injector 32F is attached to a rear portion of the upstream side elbow pipe 32A. The injector 32F discharges the urea water into the upstream side elbow pipe 32A. The urea water discharged from the injector 32F into the upstream side elbow pipe 32A is thermally decomposed by the heat of the exhaust gas, and generates the ammonia. In the present embodiment, the reducing agent that reduces the NOx is the ammonia.

The SCR device 33 has the container 33A, a reduction catalyst 33B, and various sensors 33C (second detecting unit). The container 33A is, for example, a cylindrical shape. The container 33A is disposed so that the axial direction thereof extends along the front-rear direction (X axis direction) of the dump truck 1. A front side end portion (+X side end portion) of the container 33A is connected to the downstream side elbow pipe 32C. The container 33A flows the exhaust gas and the ammonia, which flow in from the downstream side elbow pipe 32C, to the rear side (−X side). A rear side end portion (−X side end portion) of the container 33A is connected to a connection pipe 34. The exhaust gas discharged from the container 33A flows through the connection pipe 34. The connection pipe 34 is connected to an exhaust gas inflow port 3A of the vessel 3 (see FIG. 1).

The reduction catalyst 33B is disposed inside the container 33A. The reduction catalyst 33B generates a catalytic reaction between the NOx included in the exhaust gas and the ammonia generated in the mixing device 32. For example, a vanadium catalyst or a zeolite catalyst is used as the reduction catalyst 33B. The NOx included in the exhaust gas is converted into nitrogen and water by the catalytic reaction with the ammonia that serves as the reducing agent. Note that an oxidation catalyst for purifying the ammonia (ammonia oxidation catalyst: AMOX) may be provided at a downstream side of the container 33A.

The sensor 33C is disposed on an outer surface of the container 33A. The sensor 33C detects a state of the inside of the container 33A. The sensor 33C includes, for example, a temperature sensor, a NOx sensor, and an ammonia sensor. The temperature sensor detects the temperature inside the container 33A. The NOx sensors are each disposed at an upstream side (+X side) and a downstream side (−X side) of the reduction catalyst 33B. The NOx sensors detect the NOx concentration of the reduction catalyst 33B at the upstream side and the NOx concentration thereof at the downstream side. The ammonia sensor detects the amount of the ammonia inside the container 33A. The sensor 33C is disposed on a portion of a side surface of the container 33A so as not to face the container 31A. For example, the sensor 33C is disposed at a position on a right side (−Y side) with respect to the front of the dump truck 1 in an outer surface of the container 33A. Note that the sensor 33C may be a sensor that detects a state of the outside of the container 33A.

Figure 5:
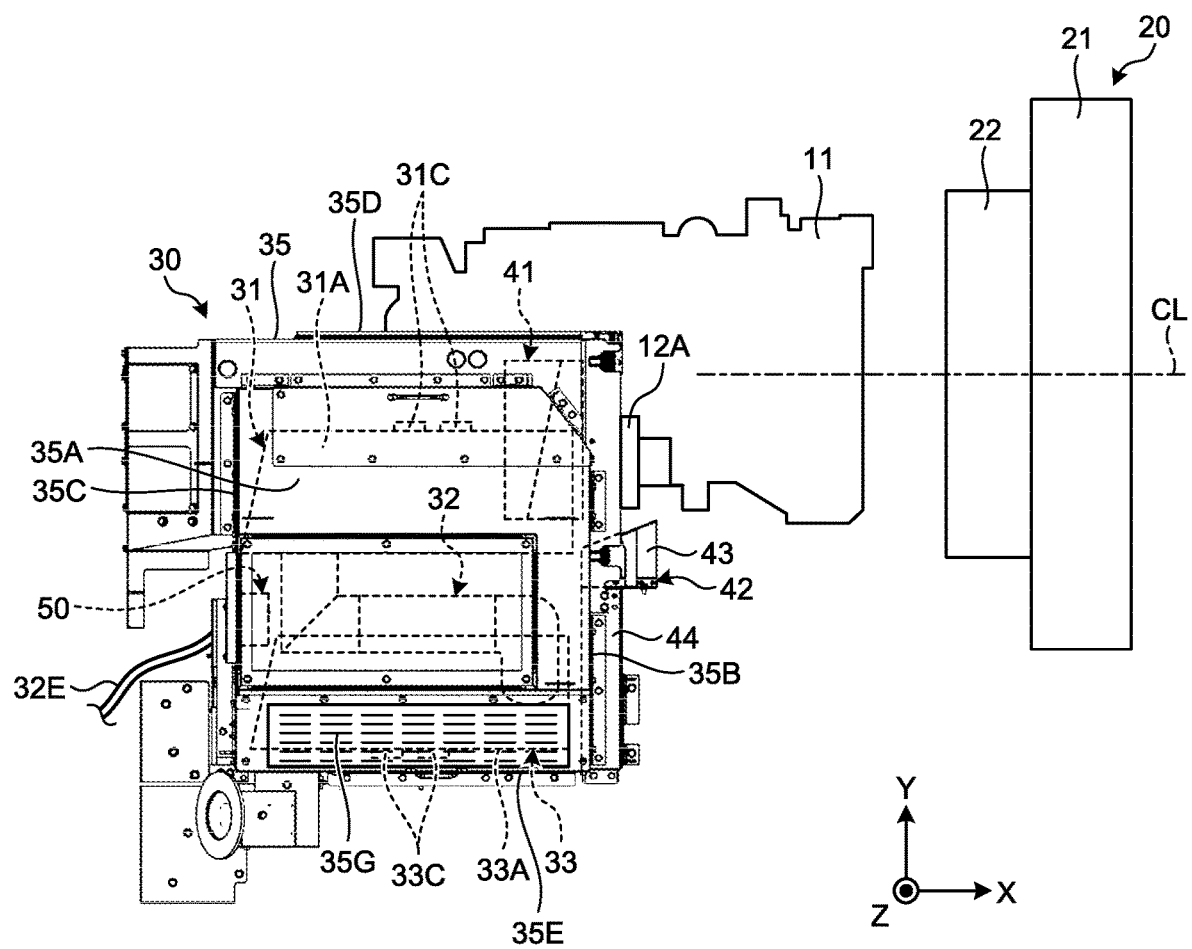
FIG. 5 is a plan view illustrating a positional relationship between the exhaust gas post-processing device, a first guide member, and a cooling device.

The exhaust gas post-processing device 30 is covered with a cover member 35 (see, for example, FIG. 5). The cover member 35 is a box-shaped structure formed with a steel plate, and covers the DPF device 31, the mixing device 32, and the SCR device 33. The cover member 35 is, for example, placed on a bottom plate 5H (see FIGS. 1 and 3). The cover member 35 has an upper surface portion 35A, a front surface portion 35B, a rear surface portion 35C, and side surface portions 35D and 35E (see FIG. 5). The upper surface portion 35A, the front surface portion 35B, the rear surface portion 35C, and the side surface portions 35D and 35E may be provided with flat surfaces, may be provided with curved surfaces, or may be shapes with uneven portions, bending portion, or the like provided thereon.

The upper surface portion 35A may have a punch hole or the like (not illustrated) that communicates with the inside and outside of the cover member 35. The front surface portion 35B has an opening portion at a portion corresponding to a duct 42 (an opening portion 44F of a side guide member 44) described later (see FIGS. 7, 11, 12, and 17). The rear surface portion 35C has a plurality of slits 35F (see, for example, FIG. 8). The slits 35F are provided over the entire space of the rear surface portion 35C, for example. The side surface portion 35E has a plurality of slits 35G. The slits 35F and 35G communicate with the inside and outside of the cover member 35. Note that, in the present embodiment, the slits 35F and 35G are slit-shaped; however, the slits may be punch holes with round holes, for example.

[First Guide Device]

As illustrated in, for example, FIG. 2, the vehicle body 5 has a first guide device 40 that is a guide device. The first guide device 40 lifts the air that flows from the air blowing device 22 to the rear side (−X direction), and leads the air to the exhaust gas post-processing device 30. The first guide device 40 has a first guide member 41 and a second guide member 42. The first guide device 40 is disposed between the exhaust gas post-processing device 30 and the air blowing device 22.

The first guide member 41 guides at least portion of the air from the air blowing device 22 in a first direction, and leads such air to a first portion of the exhaust gas post-processing device 30. The first portion is a portion including, for example, the sensor 31C. The second guide member 42 lifts at least portion of the air from the air blowing device 22, guides such air in a second direction which is other than the first direction, and leads it to a second portion of the exhaust gas post-processing device 30. The second portion is a portion including, for example, the sensor 33C. The first direction is the rear direction (−X direction), for example. The second direction is a lateral direction (+Y direction and −Y direction) which is a left-right direction, for example.

In the present embodiment, the first guide member 41 includes an inclined plate disposed at the front side of the exhaust gas post-processing device 30. The inclined plate lifts and guides the air, and leads such air to the exhaust gas post-processing device 30. The second guide member 42 includes a duct disposed at the front side of the exhaust gas post-processing device 30. After guiding the air to the side, the duct guides such air to the rear side, and leads it to the exhaust gas post-processing device 30. In the following description, the first guide member 41 is appropriately referred to as an inclined plate 41, and the second guide member 42 is appropriately referred to as the duct 42. Detailed structures and the like of the inclined plate 41 and the duct 42 will be described later.

Figure 6:
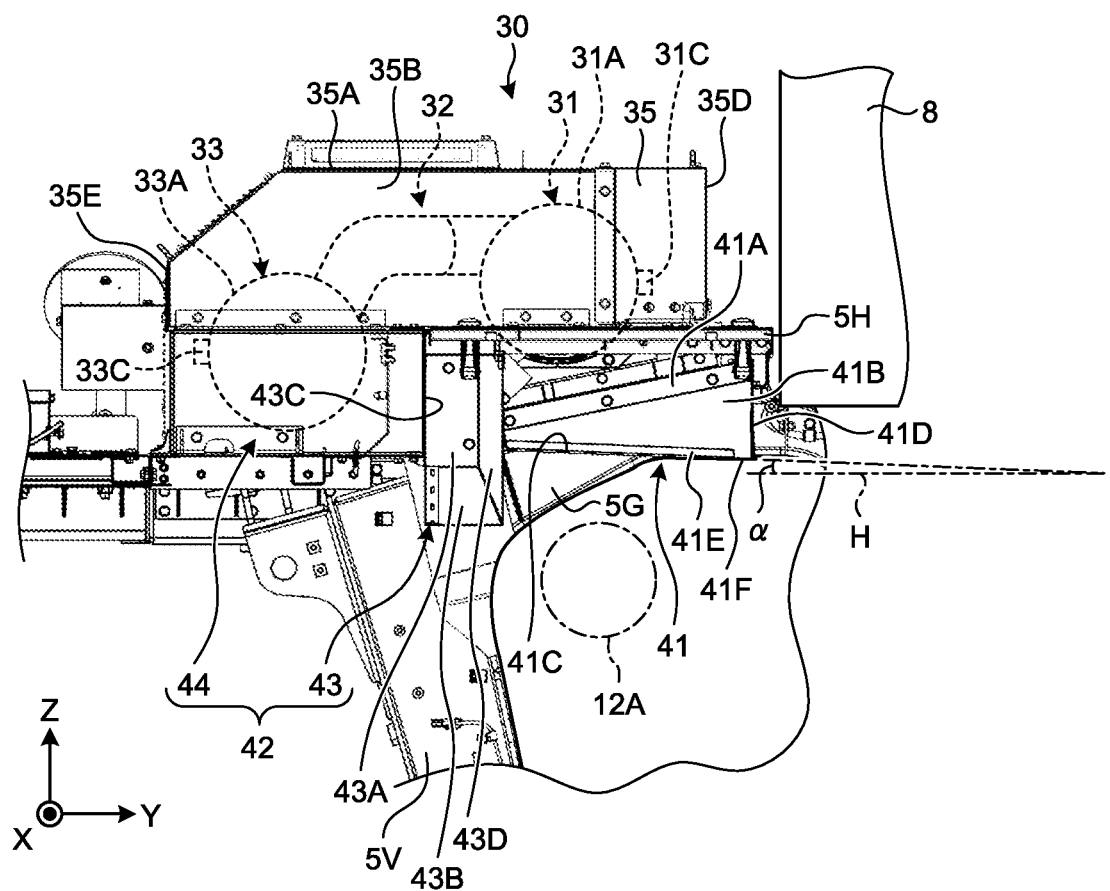
FIG. 6 is a front view illustrating the positional relationship between the exhaust gas post-processing device, the first guide member, and the cooling device.
Figure 7:
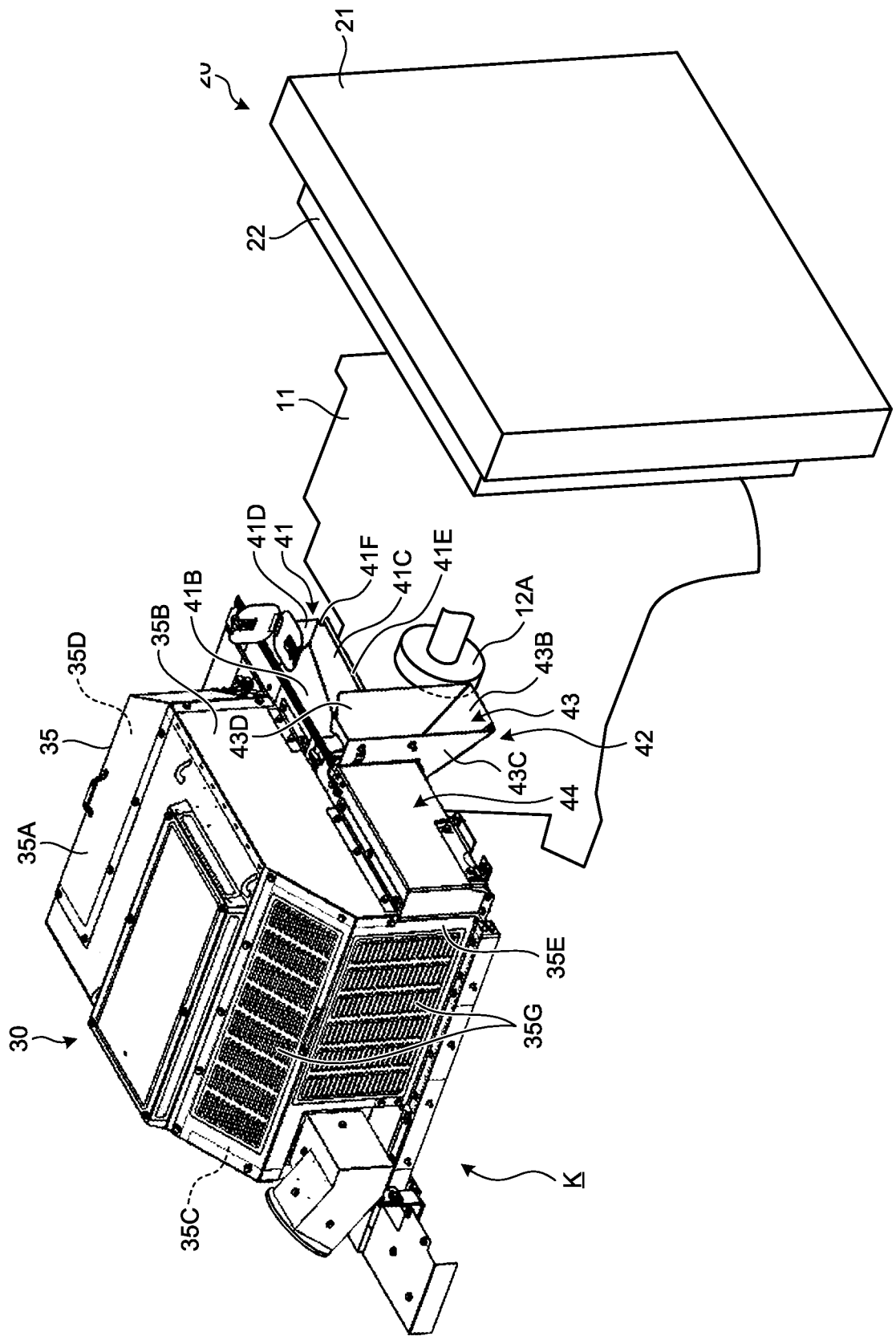
FIG. 7 is a perspective view illustrating the positional relationship between the exhaust gas post-processing device, the first guide member, and the cooling device.
Figure 8:
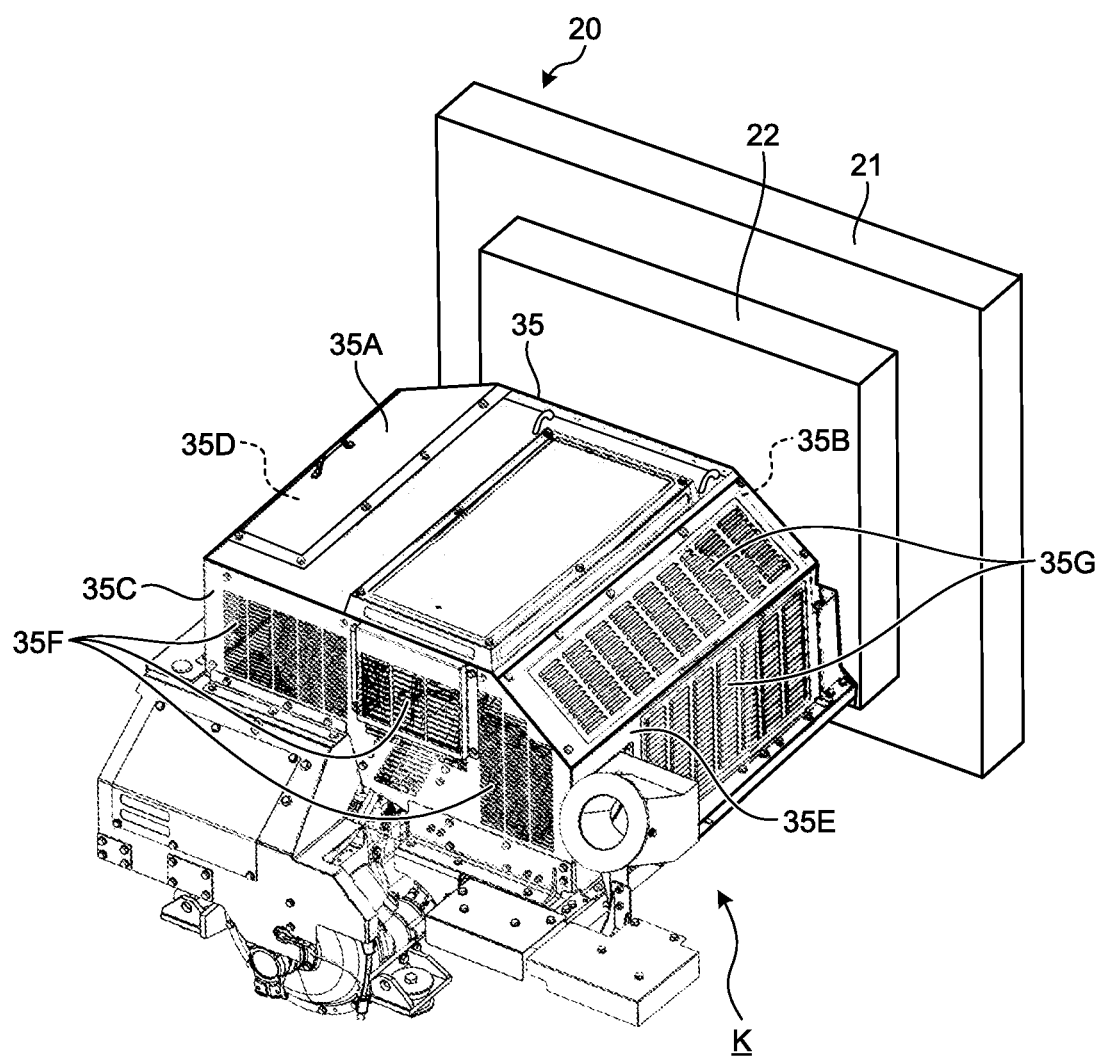
FIG. 8 is a perspective view illustrating the positional relationship between the exhaust gas post-processing device, the first guide member, and the cooling device.

A positional relationship between the exhaust gas post-processing device 30, the first guide device 40, and the cooling device 20 will be described with reference to the drawings. FIG. 5 is a plan view, FIG. 6 is a front view, and FIGS. 7 and 8 are perspective views. As illustrated in FIG. 5, the inclined plate 41 is disposed in front (+X side) of the sensor 31C. In a plan view, a portion of the inclined plate 41 overlaps the container 31A of the DPF device 31, and a remaining portion is disposed at a position protruding to a left side (+Y side) with respect to the container 31A. In a plan view, the inclined plate 41 is disposed at a position overlapping the engine 11. The duct 42 is disposed at a front surface portion 35B of the cover member 35. In addition, the duct 42 is disposed in front (+X side) and at a right side (−Y side) of the inclined plate 41. The duct 42 is disposed at a position shifted to a right side (−Y side) with respect to a central axis CL of the engine 11 and the air blowing device 22.

As illustrated in FIG. 6, the inclined plate 41 is disposed below (−Z side) the bottom plate 5H. The inclined plate 41 is, for example, disposed on a −Z side of a +Y side end portion of the container 31A. The inclined plate 41 is disposed above (+Z side) the exhaust turbine 12A of the supercharger 12. Moreover, in a front view, the sensor 31C of the DPF device 31 is disposed inside of a width in a left-right direction (Y axis direction) of the inclined plate 41, and above the inclined plate 41. The inclined plate 41 is, for example, fixed to a cross frame 5G. The cross frame 5G is a member continuously connected to a vertical member 5V (drawing) that rises from the main frame 5F to the upper side (+Z side). In a front view, the cross frame 5G is disposed so as to incline upward (+Z side) toward a left side (+Y side). The inclined plate 41 may be fixed to the bottom plate 5H.

The duct 42 is disposed side by side on a right side (−Y side) of the inclined plate 41. In a front view, the duct 42 is disposed at a position overlapping the sensor 33C of the SCR device 33. The duct 42 is disposed at substantially the same height position (position in a Z axis direction) as the inclined plate 41.

As illustrated in, for example, FIG. 5, the first guide device 40 is disposed in an area through which the air that flows from the air blowing device 22 to the rear side flows. In other words, the inside of a cylinder, which is formed with a bottom surface with an outer edge that is an outer diameter of the fan 22A, roughly corresponds to the area through which the air that flows from the air blowing device 22 to the rear side flows. In addition, the inclined plate 41 and the duct 42 are disposed inside such area. In the present embodiment, the engine 11 is disposed between the air blowing device 22 and the first guide device 40 in a front-rear direction (X axis direction). The air that flows from the air blowing device 22 to the rear side includes air that passes through the engine 11. The temperature of the air that passes through the engine 11 increases by the reception of heat from the engine 11. However, the temperature of the air that has passed through the engine 11 is lower than the temperature inside the cover member 35 in the exhaust gas post-processing device 30 during the operation of the engine 11 or immediately after the operation of the engine 11 has stopped.

Figure 9:
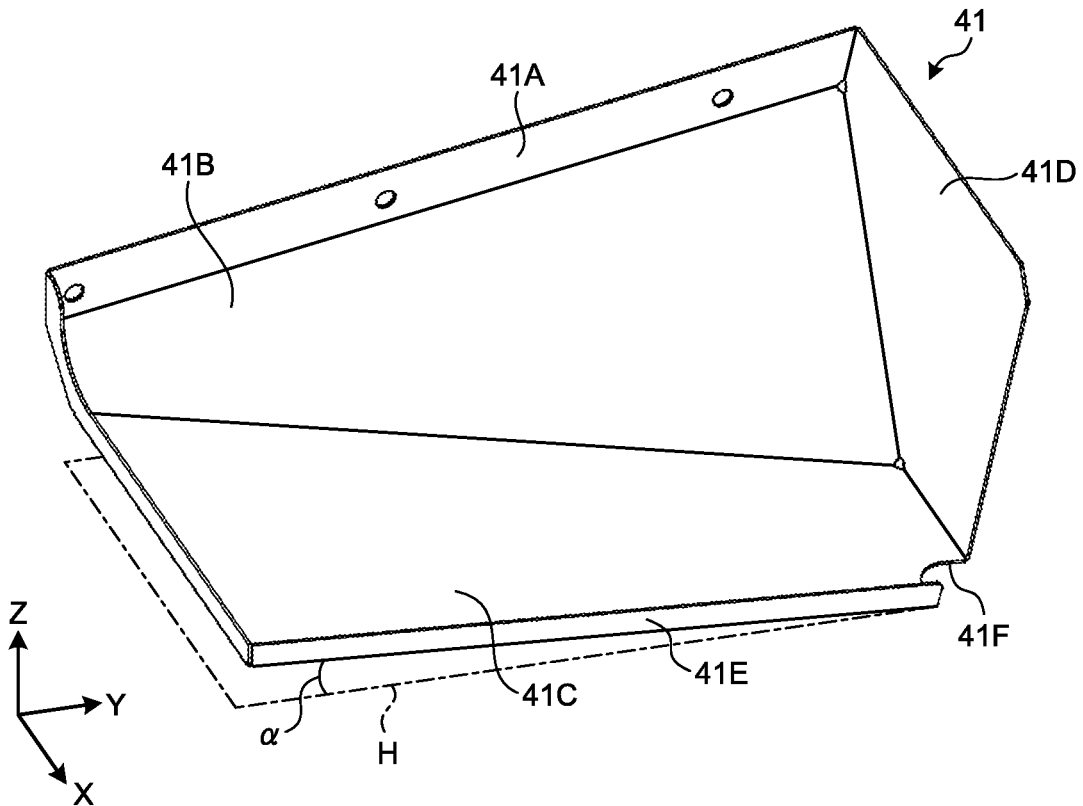
FIG. 9 is a perspective view illustrating an example of an inclined plate.
Figure 10:
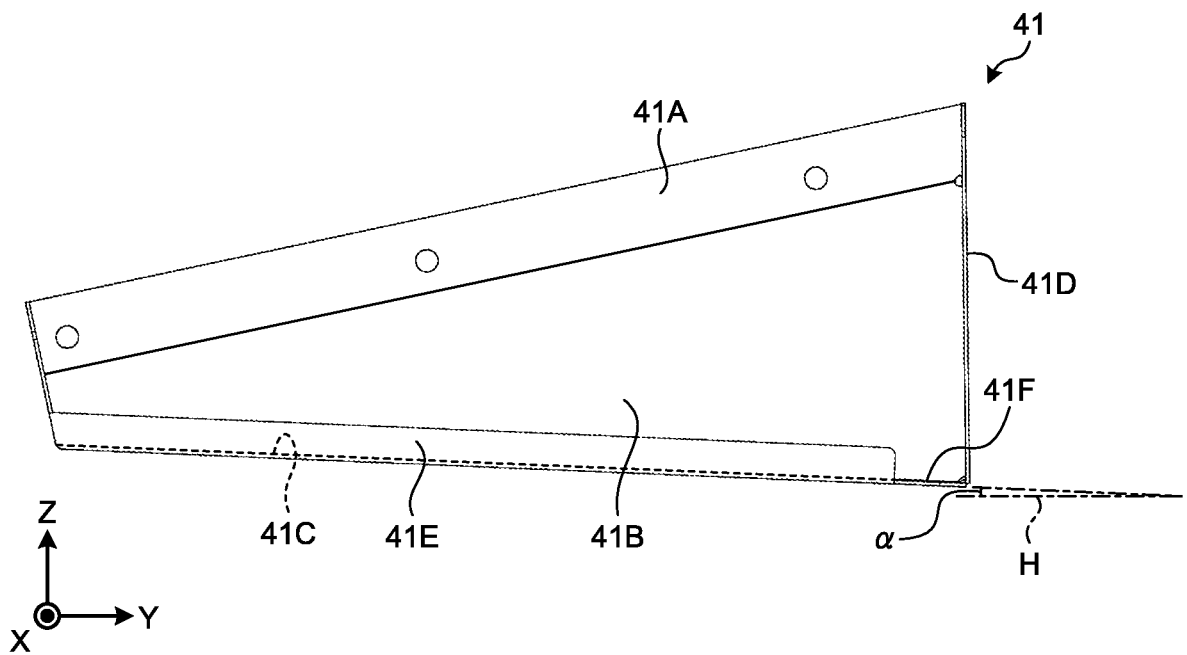
FIG. 10 is a front view illustrating an example of the inclined plate.

FIGS. 9 and 10 are views illustrating examples of the inclined plate 41 that is a first guide member. FIG. 9 is a perspective view, and FIG. 10 is a front view illustrating a shape of the inclined plate 41 as viewed from a +side of the X axis illustrated in FIG. 9. As illustrated in FIGS. 9 and 10, the inclined plate 41 has a fixing portion 41A, an inclined portion 41B, a bottom surface portion 41C, and a side surface portion 41D. In the present embodiment, the fixing portion 41A, the inclined portion 41B, the bottom surface portion 41C, and the side surface portion 41D are each formed with flat surfaces. However, the shapes thereof are not limited to these shapes, and may be curved surfaces or shapes with uneven portions. In the present embodiment, the inclined plate 41 has a structure in which cutout portions are integrated with each other by bending a single plate member including the cutout portions. However, the present invention is not limited to such structure, and may have a structure in which a plurality of plate members is bonded by welding or the like. A steel plate may be used as the plate member, for example.

The fixing portion 41A is fixed to, for example, the cross frame 5G by a fixing member such as a bolt. As illustrated in FIG. 6, the fixing portion 41A is disposed so as to incline with respect to the ground contact surface in correspondence with the inclination of the cross frame 5G.

The inclined portion 41B guides the air, which flows from the air blowing device 22 to the rear side (−X direction), to an upper side (+Z side) toward the DPF device 31. The bottom plate 5H has an opening portion at a portion corresponding to the inclined plate 41. The air guided by the inclined portion 41B passes through the opening portion, and flows into the cover member 35. The inclined portion 41B is disposed so as to incline toward an upper side (+Z direction) from the front side (+X side) to the rear side (−X side). A lower side of the inclined portion 41B is disposed so as to incline toward a front side (+X direction) from the right side (−Y side) to the left side (+Y side).

The bottom surface portion 41C is connected to a lower portion of the inclined portion 41B. The bottom surface portion 41C is disposed at a position that covers an upper side (+Z side) of the exhaust turbine 12A in the supercharger 12 (see, for example, FIGS. 6 and 7). By covering the upper side (+Z side) of the exhaust turbine 12A, the bottom surface portion 41C suppresses the entering of liquid such as water from the upper side (+Z side) of the supercharger 12, and ensures water-tightness of the supercharger 12. The bottom surface portion 41C is disposed so as to incline with respect to a horizontal direction. Specifically, the bottom surface portion 41C inclines lower in a left side end portion (+Y direction side end portion) than in a right side end portion (−Y side end portion). The bottom surface portion 41C is disposed so as to incline at a predetermined angle α with respect to a virtual plane H parallel to the ground contact surface (see FIGS. 6, 9, and 10). Therefore, the liquid such as water that adheres to the bottom surface portion 41C flows to the left side (+Y direction) along the inclination of the bottom surface portion 41C. The predetermined angle α can be set appropriately.

In addition, the bottom surface portion 41C has an edge portion 41E. The edge portion 41E is disposed at a front side (+X side) of the bottom surface portion 41C. The edge portion 41E suppresses the spill and drop of the liquid, which adheres to the bottom surface portion 41C, to the front side (+X side). Furthermore, the bottom surface portion 41C has a cutout portion 41F. The cutout portion 41F is, for example, disposed at a corner portion in the front side (+X side) and the left side (+Y side) of the bottom surface portion 41C. The cutout portion 41F is disposed at a left side of the edge portion 41E (+Y side). The cutout portion 41F may be straight or curved, or may be a shape with a corner portion. The cutout portion 41F collects and drops the liquid such as water that flows on the bottom surface portion 41C. Therefore, the bottom surface portion 41C, the edge portion 41E, and the cutout portion 41F drop the liquid such as water that has been dropped off on the inclined plate 41 from a position at the left side (+Y side) of the supercharger 12 (see FIG. 6). As a result, the bottom surface portion 41C, the edge portion 41E, and the cutout portion 41F suppress the fall of the liquid onto the supercharger 12 and the entering of the liquid to the supercharger 12, and more reliably ensure the water-tightness of the supercharger 12.

The side surface portion 41D is connected to the inclined portion 41B and the bottom surface portion 41C. The side surface portion 41D is disposed at the left side (+Y side) of the inclined portion 41B and the bottom surface portion 41C. The side surface portion 41D protrudes to the front side (+X side) so as to collect the air that flows from the air blowing device 22 to the rear side (−X direction) and not let the air to escape to the left side (+Y side).

Figure 11:
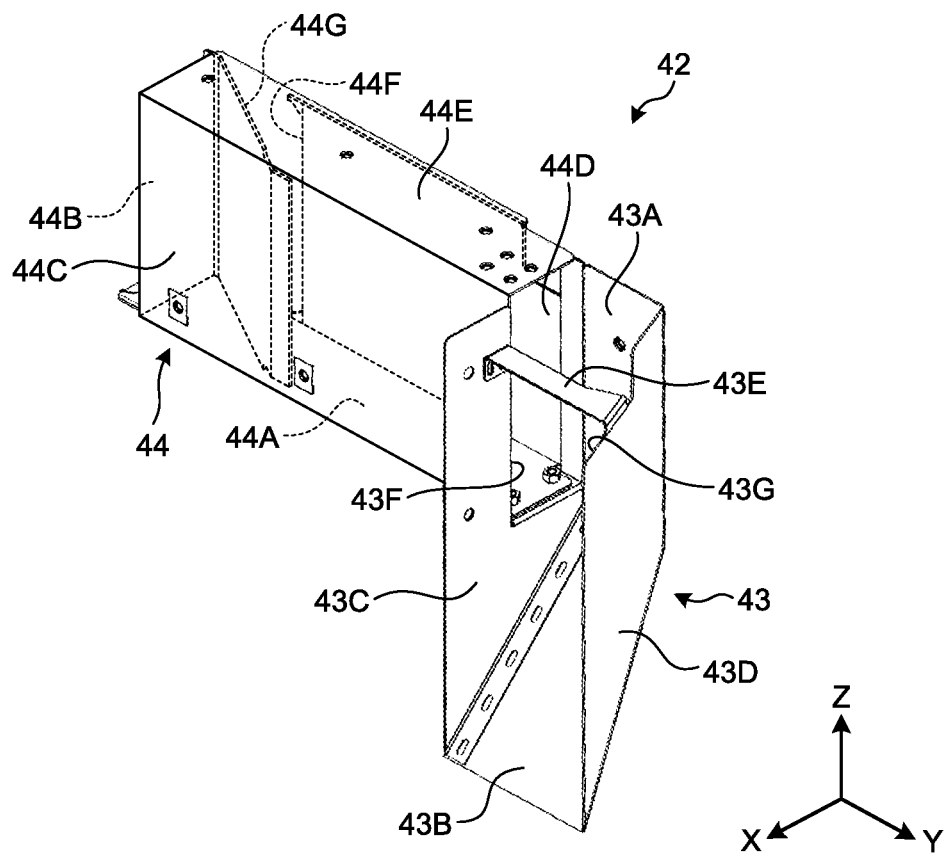
FIG. 11 is a perspective view illustrating an example of a duct.
Figure 12:
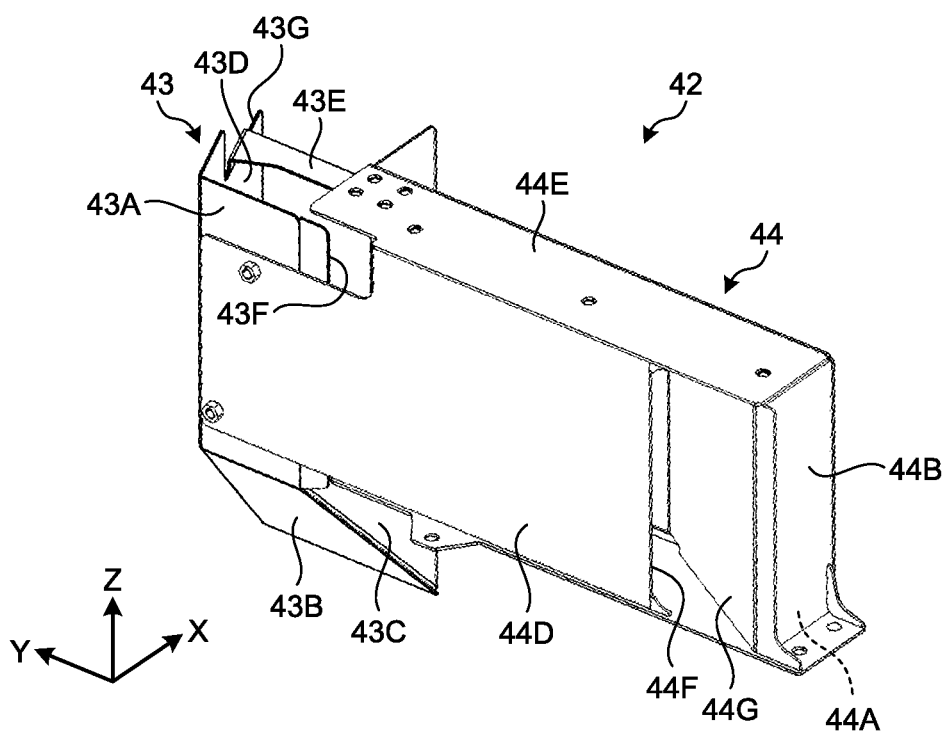
FIG. 12 is a perspective view illustrating an example of the duct.

FIGS. 11 and 12 are perspective views illustrating examples of the duct 42 that is a second guide member. FIG. 11 is a view as viewed from the front side (+X side), and FIG. 12 is a view as viewed from the rear side (−X side). As illustrated in FIGS. 6 and 7, the duct 42 is disposed at the front side (+X side) of the front surface portion 35B of the cover member 35. The duct 42 has an air intake member 43 and the side guide member 44.

The air intake member 43 takes in the air that flows from the air blowing device 22 to the rear side (−X direction). The air intake member 43 is shaped so that a front side (+X side) and an upper side (+Z side) thereof are opened. An opening portion side of the air intake member 43 protrudes to the front side (+X side) with respect to the side guide member 44. The air intake member 43 has a rear surface portion 43A, a bottom surface portion 43B, side surface portions 43C and 43D, and an upper connecting portion 43E. In the present embodiment, the rear surface portion 43A, the bottom surface portion 43B, and the side surface portions 43C and 43D are each formed with flat surfaces. However, the shapes thereof are not limited to these shapes, and may be curved surfaces or shapes with uneven portions. In the present embodiment, the air intake member 43 has a structure in which cutout portions are integrated with each other by bending a single plate member including the cutout portions. However, the present invention is not limited to such structure, and may have a structure in which a plurality of plate members is bonded by welding or the like. Note that a steel plate may be used as the plate member, for example.

The rear surface portion 43A is formed in a rectangular shape. The rear surface portion 43A is a surface substantially perpendicular to a front-rear direction (see FIG. 2). In other words, the rear surface portion 43A is disposed parallel to a YZ flat surface. The rear surface portion 43A is fixed to, for example, the cross frame 5G by a fixing member such as a bolt. The bottom surface portion 43B is connected to a lower side of the rear surface portion 43A. The side surface portions 43C and 43D are connected to the sides of the rear surface portion 43A.

The bottom surface portion 43B is formed in a trapezoidal shape, for example. The bottom surface portion 43B extends from the lower side of the rear surface portion 43A toward the front side (+X side) and the lower side (−Z side). In other words, the bottom surface portion 43B is disposed so as to incline with respect to the ground contact surface. The bottom surface portion 43B has a trapezoidal shape spread to the left and right from a rear portion toward a front portion.

The side surface portions 43C and 43D are, for example, formed in trapezoidal shapes. The side surface portion 43C extends from a side at the right side (−Y side) toward the front side (+X side) of the rear surface portion 43A. The side surface portion 43D extends from a side at the left side (+Y side) toward the front side (+X side) and the left side (+Y side) of the rear surface portion 43A. Therefore, the side surface portion 43D is disposed so as to be opened toward the left side (+Y side) from the rear portion to the front portion with respect to the side surface portion 43C (see FIG. 6). Accordingly, the air intake member 43 has a shape that spreads toward the left side (+Y side) from the rear surface portion 43A to the opening portion. As a result, as illustrated in FIG. 5, the air intake member 43 has a shape that spreads in a direction in which the air blowing device 22 is disposed, and the bottom surface portion 43B inclines from the lower side to the upper side, as described above. Therefore, the air intake member 43 can lift, collect, and efficiently take in the air that flows from the air blowing device 22 to the rear side (−X direction).

The side surface portion 43C has a cutout portion 43F. The cutout portion 43F is formed in a rectangular shape from an upper side of the side surface portion 43C toward the lower side (−Z side). The cutout portion 43F communicates an inner side of the air intake member 43, that is, a portion surrounded by the rear surface portion 43A, the bottom surface portion 43B, and the side surface portions 43C and 43D, with an inner side of the side guide member 44.

The upper connecting portion 43E connects the side surface portions 43C and 43D. The side surface portion 43D has a stepped portion 43G at its upper end in the front side (+X side). The upper connecting portion 43E is provided on the stepped portion 43G. The upper connecting portion 43E extends from the stepped portion 43G to the side surface portion 43C. The upper connecting portion 43E supports a space between the side surface portions 43C and 43D in order to ensure rigidity of the air intake member 43 in the vehicle width direction. Note that a steel plate may be used as the upper connecting portion 43E, for example, and the side surface portions 43C and 43D are fixed to each other by welding or a fixing member such as a bolt.

A steel plate may also be used as the side guide member 44, for example, and the side guide member 44 may also be formed by bending or welding the steel plate. The side guide member 44 guides the air that flows in from the cutout portion 43F to the right side (−Y direction). The side guide member 44 is disposed so as to extend to the right side (−Y direction) with respect to the air intake member 43. The side guide member 44 bends the air, which flows from the air blowing device 22 to the rear side (−X direction), to the right side (−Y direction), and then guides the air to the inside of the cover member 35. The side guide member 44 is formed in a rectangular box shape. The side guide member 44 has a bottom surface portion 44A, a side surface portion 44B, a front surface portion 44C, a rear surface portion 44D, and an upper surface portion 44E. A side portion at a left side (+Y side) of the side guide member 44 is opened, and communicates with the air intake member 43.

The bottom surface portion 44A, the side surface portion 44B, the front surface portion 44C, the upper surface portion 44E, and the rear surface portion 44D are each rectangle and formed with flat surfaces. However, the shapes thereof are not limited to these shapes, and may be shapes other than rectangle, or may be curved surfaces or shapes with uneven portions.

The bottom surface portion 44A is parallel to the horizontal plane. An end portion at the left side (+Y side) of the bottom surface portion 44A is fixed to a lower end portion of the cutout portion 43F. The bottom surface portion 44A is disposed along the left-right direction (Y axis direction) from the lower end portion of the cutout portion 43F. The bottom surface portion 44A closes a lower side (−Z side) of the side guide member 44. The side surface portion 44B closes a side on the right side (−Y side) of the side guide member 44. The front surface portion 44C closes the front side (+X side) of the side guide member 44. The upper surface portion 44E closes the upper side (+Z side) of the side guide member 44. In other words, a flow path through which the air flows is formed by the bottom surface portion 44A, the side surface portion 44B, the front surface portion 44C, the rear surface portion 44D, and the upper surface portion 44E.

The rear surface portion 44D is disposed on the rear side (−X side) of the side guide member 44. The rear surface portion 44D has the opening portion 44F. The opening portion 44F is disposed in a right side end portion (−Y side end portion) of the rear surface portion 44D. A position in the front surface portion 35B of the cover member 35 corresponding to the opening portion 44F is opened (see FIG. 7). Therefore, the inside of the side guide member 44 and the inside of the cover member 35 are communicated with each other by the opening portion 44F. The opening portion 44F communicates the inside of the side guide member 44, that is, a portion surrounded by the bottom surface portion 44A, the side surface portion 44B, the front surface portion 44C, the upper surface portion 44E, and the rear surface portion 44D, with a space in the rear side (−X side) of side guide member 44. An end portion at the left side (+Y side) of the rear surface portion 44D is disposed at a position so as to overlap the rear surface portion 43A of the air intake member 43. The rear surface portion 44D is fastened to the rear surface portion 43A by, for example, a fixing member such as a bolt.

A guide plate 44G is provided inside the side guide member 44. The guide plate 44G guides the air that flows inside the side guide member 44 to the opening portion 44F. The guide plate 44G is formed in a rectangular shape. The guide plate 44G is disposed between an edge at the right side (−Y side) of the opening portion 44F and the front surface portion 44C. Specifically, in a plan view (as viewed from an upper side (+Z side)), from the left side toward the right side, the guide plate 44G is disposed so as to incline to the rear side (−X side), one side of the guide plate 44G is joined to the front surface portion 44C, and the other side that faces the one side is joined to a short side at the right side of the opening portion 44F. Therefore, by providing the guide plate 44G, the air, which has been taken in by the air intake member 43 and that has flowed through the inside of the side guide member 44 to the right side (−Y direction), efficiently flows to the opening portion 44F.

[Second Guide Device]

Figure 13:
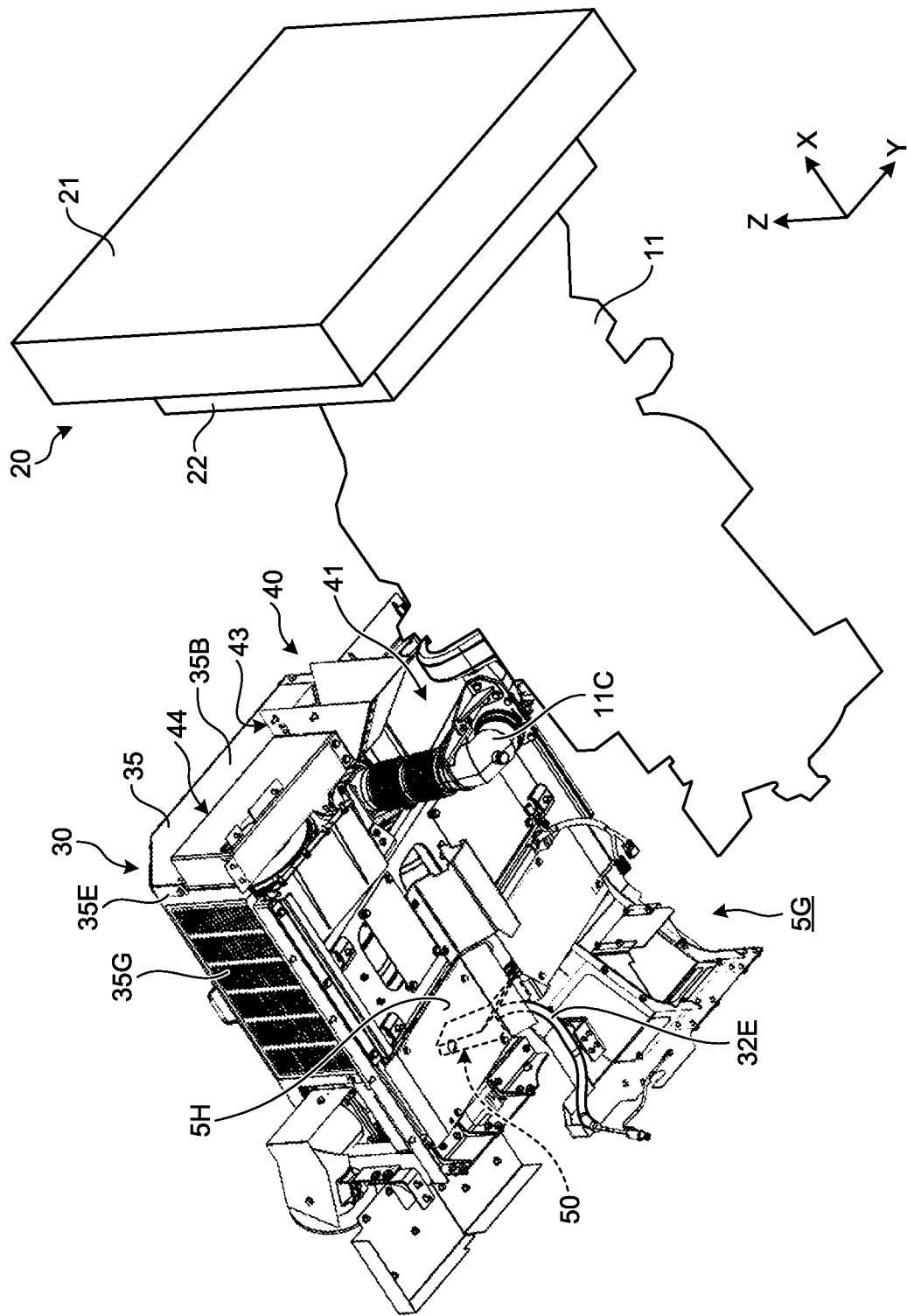
FIG. 13 is a perspective view illustrating a positional relationship between the exhaust gas post-processing device, a second guide member, and the cooling device.
Figure 14:
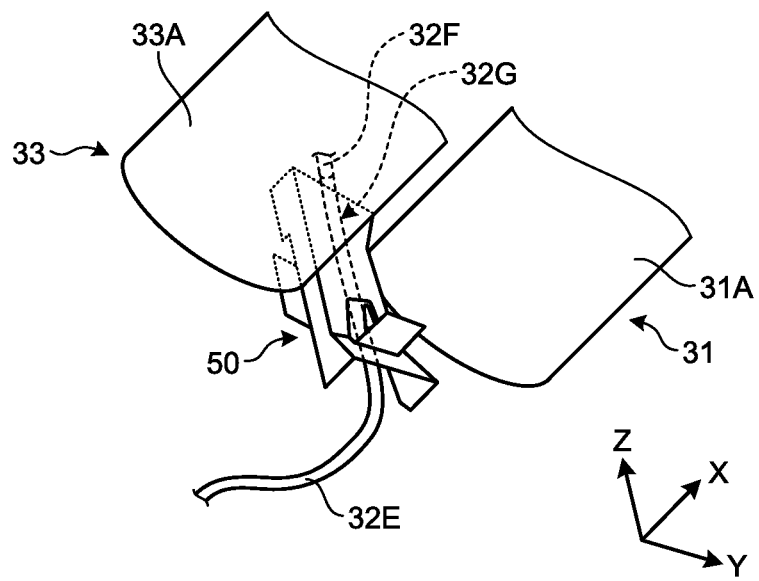
FIG. 14 is a view illustrating an enlarged view of a main part in FIG. 13.

A second guide device 50 that is a guide device that the vehicle body 5 has in the present embodiment will be described. FIG. 13 is a perspective view illustrating a positional relationship between the exhaust gas post-processing device 30, the second guide device 50, and the cooling device 20. In addition, FIG. 13 illustrates a state of the exhaust gas post-processing device 30 and the like as viewed from the front side (+X side) and the lower side (−Z side). Note that the engine 11 and the like are illustrated in a simplified manner. FIG. 14 is a view illustrating an enlarged view of a main part in FIG. 13 including the second guide device 50. Furthermore, FIG. 14 is illustrated in a state of omitting the bottom plate 5H.

As illustrated in FIGS. 13 and 14, the second guide device 50 is disposed on a rear portion of the exhaust gas post-processing device 30. The second guide device 50 is disposed between the container 31A of the DPF device 31 and the container 33A of the SCR device 33. The second guide device 50 is disposed so as to cover the front side (+X side) and both sides in the left-right direction of the container-between portion 32G of the supply pipe 32E. The second guide device 50 leads the air, which has been flowed from the front side (+X side) through the space portion K, to the container-between portion 32G in the supply pipe 32E. In addition, the second guide device 50 shields the heat radiated from the DPF device 31 and SCR device 33.

Figure 15:
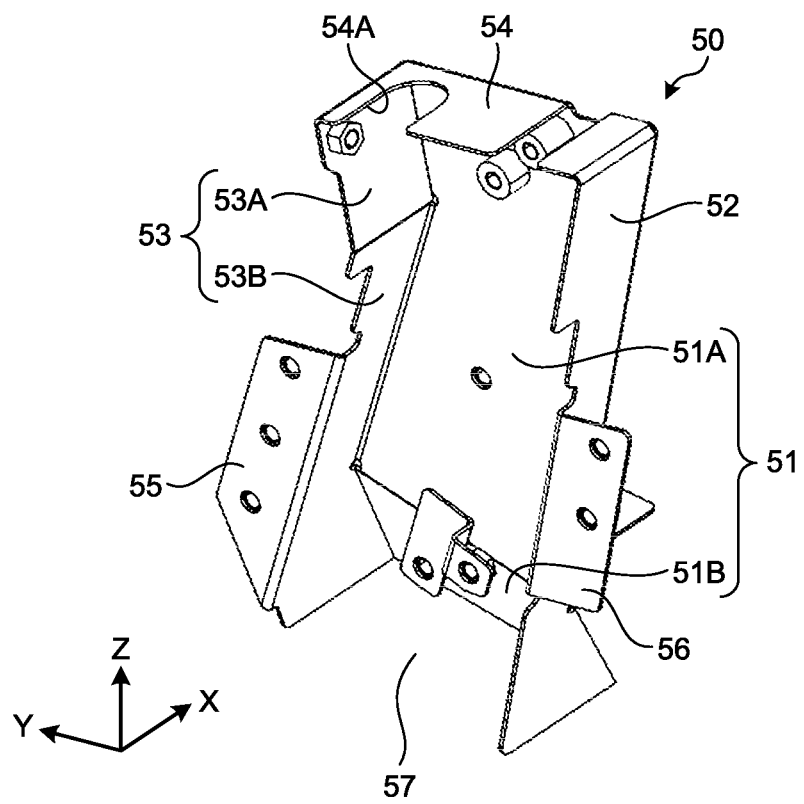
FIG. 15 is a perspective view illustrating an example of the second guide member.

FIG. 15 is a perspective view illustrating an example of the second guide device 50. As illustrated in FIG. 15, the second guide device 50 has a front surface portion (wall portion) 51, side surface portions (wall portions) 52 and 53, and an upper surface portion 54. A steel plate may be used as the second guide member 50, for example, and the second guide member 50 may be formed by bending or welding the steel plate. The front surface portion 51 has a first surface 51A and a second surface 51B. The first surface 51A is disposed so that surfaces of the first surface 51A are in a perpendicular relationship in a front-rear direction (see FIG. 18). The second surface 51B is disposed so that an end portion at the lower side (−Z side) is positioned in front (+X side) of a position of the first surface 51A, and so as to incline to a plane (YZ plane) perpendicular to the front-rear direction (see FIG. 18). As illustrated in FIG. 18, a holder 58 that holds the container-between portion 32G is fixed to the front surface portion 51. The holder 58 holds the container-between portion 32G so as not to come into contact with the second guide device 50. The holder 58 suppresses the direct transmission of the heat from the second guide device 50 to the container-between portion 32G.

The side surface portion 52 is formed with a flat surface. The side surface portion 52 is disposed on the right side (−Y side) of the container-between portion 32G. The side surface portion 53 has a first surface 53A and a second surface 53B. The first surface 53A and the second surface 53B are formed with, for example, flat surfaces. The first surface 53A and the second surface 53B are disposed along the container-between portion 32G. The side surface portions 52 and 53 have fixing pieces 55 and 56 fixed to the rear surface portion 35C of the cover member 35. The fixing pieces 55 and 56 are fixed to an inner surface of the rear surface portion 35C by a fixing member such as a bolt.

The upper surface portion 54 is formed with a flat surface. The upper surface portion 54 is disposed parallel to the horizontal plane. The upper surface portion 54 has a cutout portion 54A. The container-between portion 32G is disposed so as to penetrate the upper surface portion 54 in the cutout portion 54A.

The second guide device 50 has an air intake portion 57 at its lower side end portion (−Z side end portion). The air intake portion 57 is continuously connected to the space portion K illustrated in FIG. 1. The second guide device 50 has an internal space, that is, a portion surrounded by the front surface portion 51, the side surface portion 52, the side surface portion 53, and the upper surface portion 54, which is provided along the vertical direction (Z axis direction). The second guide device 50 can lift and flow the air taken in from the air intake portion 57 along the container-between portion 32G to the upper side (+Z side).

In the dump truck 1 configured as described above, the engine 11 generates exhaust gas by combusting fuel supplied from the fuel tank 13 in a case of actuating the engine 11. The exhaust gas is supplied to the exhaust gas post-processing device 30 via the exhaust pipe 11C. The exhaust gas post-processing device 30 post-processes the supplied exhaust gas.

In the exhaust gas post-processing device 30, the temperature of the DPF device 31, the mixing device 32, and the SCR device 33 are increased by the heat of the exhaust gas. When the temperature of each device is increased, the heat accumulates inside the cover member 35 and thus, the temperature inside the cover member 35 increases. In such case, detection accuracy of the sensor 31C mounted on the DPF device 31 and the sensor 33C mounted on the SCR device 33 may be reduced due to the influence of the heat. Moreover, the wiring or the like connected to the sensors 31C and 33C may be, for example, deformed due to the influence of the heat.

On the other hand, when the engine 11 is actuated, the fan 22A of the air blowing device 22 is rotated. The air blowing device 22 sends the air to the rear side (−X direction) by the rotation of the fan 22A. The air sent to the rear side (−X direction) by the fan 22A includes the air that has passed from the front side (+X side) of the radiator 21 through the radiator 21. The temperature of such air is a temperature lower than the temperature inside the cover member 35.

Figure 16:
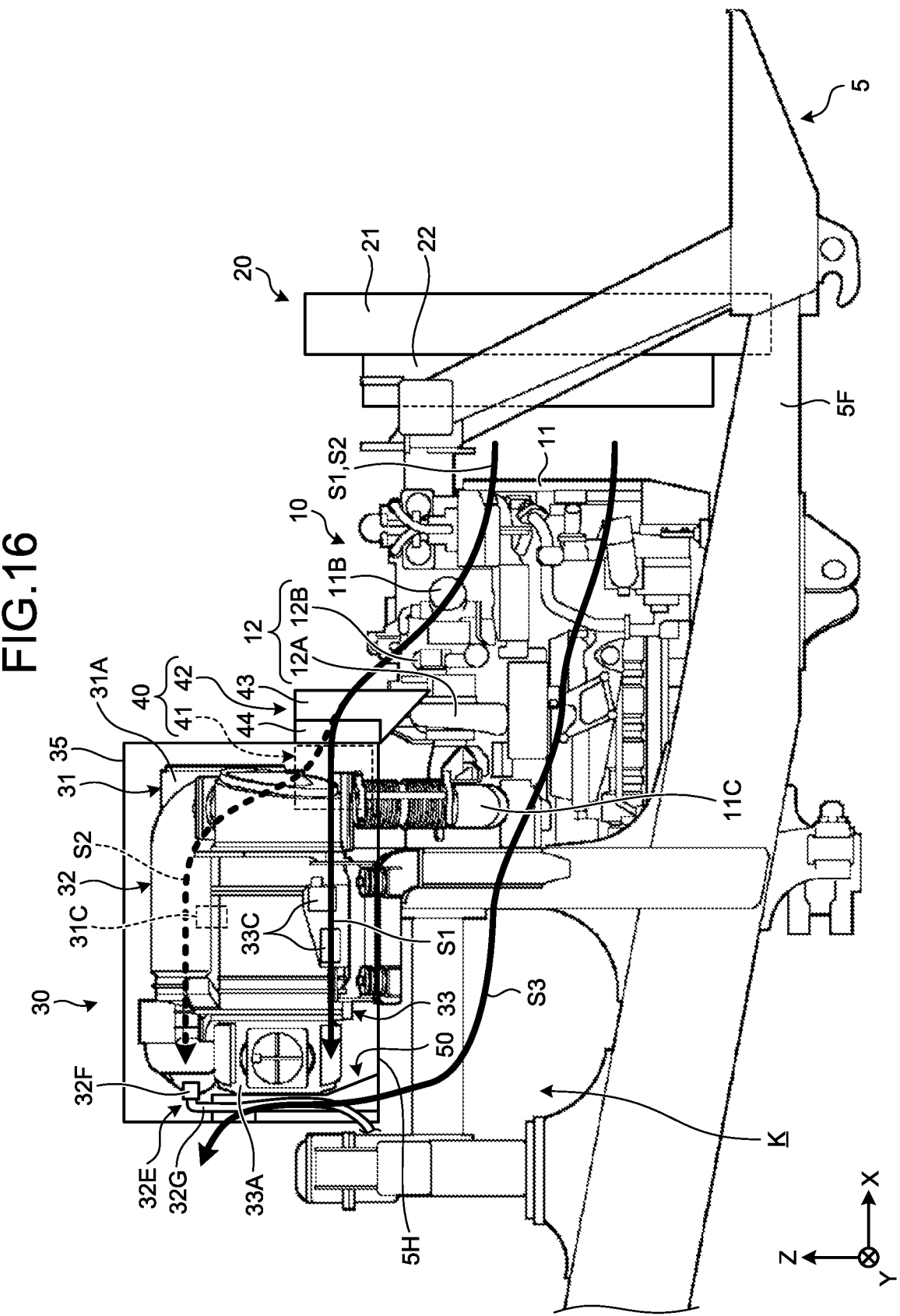
FIG. 16 is a view illustrating the flow of air sent from an air blowing device to a rear side.

FIG. 16 is a view illustrating the flow of the air sent from the air blowing device 22 to the rear side (−X direction). In FIG. 16, the position and the direction in which the air flows are illustrated by thick solid lines (S1 and S3) or a thick broken line (S2), and arrows. As illustrated in FIG. 16, the air S1 and S2 flow from the air blowing device 22 to the rear side (−X direction), while crossing the engine 11, and reach, for example, the first guide device 40. The air S1 and S2 are led to the exhaust gas post-processing device 30 by the first guide device 40.

Figure 17:
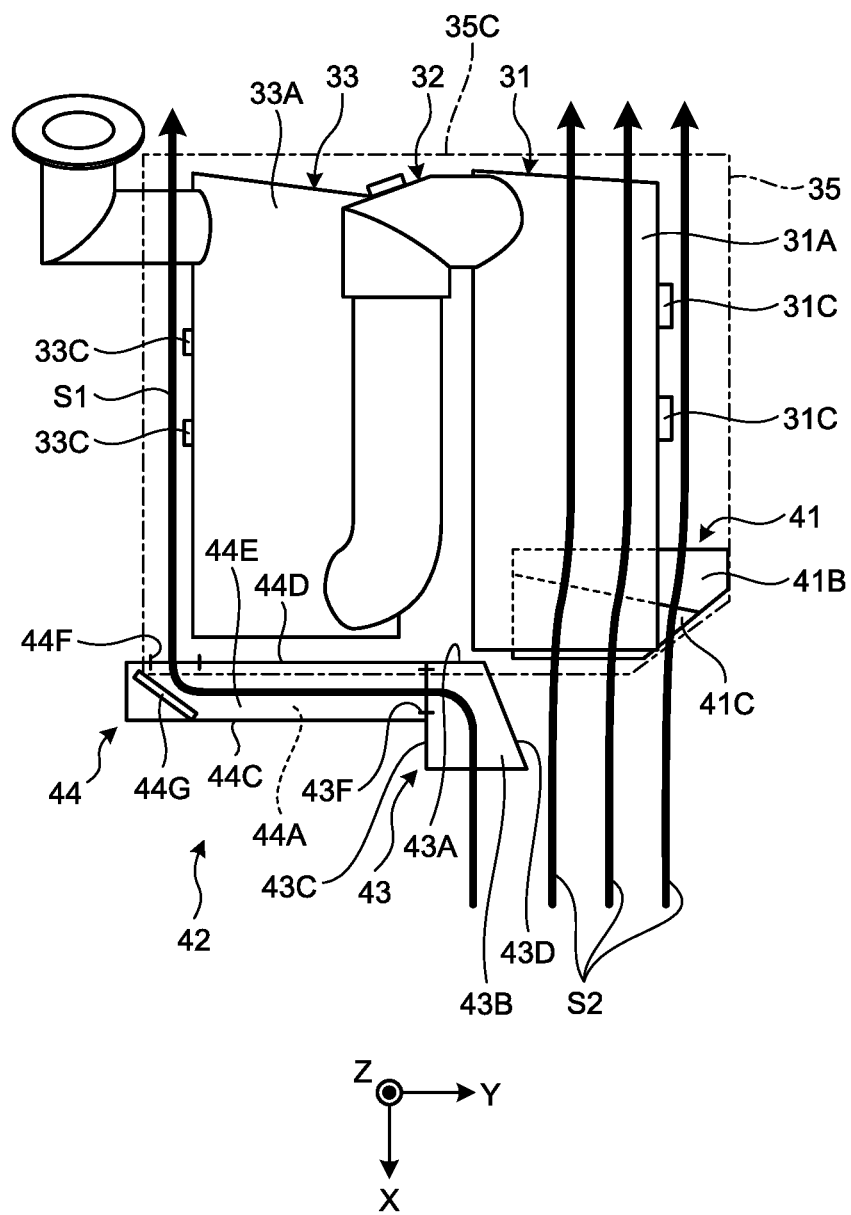
FIG. 17 is a view illustrating the flow of air led by the first guide member.

FIG. 17 is a view illustrating the flow of the air S1 and S2 led by the first guide device 40. Similarly as in FIG. 16, FIG. 17 also illustrates the position and the direction in which the air flows by thick solid lines (S1 and S2) and arrows. As illustrated in FIGS. 16 and 17, by the inclined portion 41B of the inclined plate 41, the air S2 is sent from the lower side (−Z side) of the cover member 35 to the upper side (+Z side) through an inner side of the cover member 35. Moreover, the air S2 flows from an opening portion (not illustrated) provided at the bottom plate 5H into the cover member 35.

Inside the cover member 35, the air S2 flows along the left side end portion (+Y side end portion) of the container 31A of the DPF device 31 to the rear side (−X direction). After passing the vicinity of the sensor 31C, the air S2 is discharged from the slit 35G to the outside of the cover member 35. In other words, the air that has flowed from the fan 22A of the air blowing device 22 is lifted to the upper side and sent to the rear side by the first guide device 40. The left side end portion of the container 31A (+Y side end portion) and the surrounding space thereof, the sensor 31C, and the like are cooled by the flow of the air S2. Therefore, the influence of the heat on the sensor 31C, the wiring, and the like is suppressed.

In addition, the air S1 is taken into the air intake member 43 of the duct 42, and flows the inside of the air intake member 43 to the rear side (−X direction). The air S1 is sent to the side guide member 44 in the cutout portion 43F, and flows the inside of the side guide member 44 to the right side (−Y direction). In other words, the flow of the air S1 is bent from the rear side (−X direction) to the right side (−Y direction). Furthermore, the air S1 is guided by the guide plate 44G to flow to the rear side (−X direction), and flows from the opening portion 44F into the inner side of the cover member 35. In other words, the flow of the air S1 is bent from the right side (−Y direction) to the rear side (−X direction).

Inside the cover member 35, the air S1 flows along the right side end portion (−Y side end portion) of the container 33A of the SCR device 33 to the rear side (−X direction). After passing the vicinity of the sensor 33C, the air S1 is discharged from the slit 35G to the outside of the cover member 35. In other words, the air that has flowed from the fan 22A of the air blowing device 22 is sent to the rear side after being lifted to the upper side and bent by the first guide device 40. The right side end portion of the container 33A (−Y side end portion) and the surrounding space thereof, the sensor 33C, and the like are cooled by the flow of the air S1. Therefore, the influence of the heat on the sensor 33C, the wiring, and the like is suppressed.

On the other hand, as illustrated in FIG. 16, the air S3 flows from the air blowing device 22 to the space portion K at the rear side (−X direction) while crossing the engine 11. Portion of the air S3 flows from the space portion K to the upper side (+Z side), and reaches, for example, the second guide device 50. The air S3 is led to the inside of the cover member 35, which is the rear portion of the exhaust gas post-processing device 30, by the second guide device 50. In other words, the air that has flowed from the fan 22A of the air blowing device 22 is lifted to the upper side and sent to the rear side by the second guide device 50.

FIG. 18 is a view illustrating the details of the flow of the air S3 led by the second guide device 50. Note that, the illustration of the side surface portion 52 is omitted in FIG. 18. As illustrated in FIG. 18, the air S3 is led from the lower side end portion (−Z side end portion) of the second guide device 50 into the inside of the second guide device 50. In a space surrounded by the front surface portion 51, the side surface portion 52, and the side surface portion 53, the air S3 flows to the upper side (+Z direction) along the container-between portion 32G of the supply pipe 32E. The air S3 is led to the rear side (−X direction) by the upper surface portion 54 of the second guide device 50, and is discharged to the outside of the cover member 35 via the slit 35G. The front surface portion 51, the side surface portions 52 and 53, and the upper surface portion 54 of the second guide device 50, and the container-between portion 32G of the supply pipe 32E are cooled by the flow of the air S3. Therefore, the influence of the heat on the urea water that flows inside the container-between portion 32G is suppressed.

As described above, the dump truck 1 according to the present embodiment includes a guide device that lifts and guides air to an upper side where the exhaust gas post-processing device 30 is provided. Accordingly, a plurality of portions of the exhaust gas post-processing device 30 is cooled by the air led by the guide device. Since each of the portions of the exhaust gas post-processing device 30 is cooled at the same time, the exhaust gas post-processing device 30 is efficiently cooled. As a result, the influence of heat generated in the exhaust gas post-processing device 30 can be reduced.

In the dump truck 1 according to the present embodiment, the guide device includes the inclined plate 41 and the duct 42. The inclined plate 41 is a first guide member that guides at least portion of the air from the air blowing device in a first direction, and leads the air to a first portion of the exhaust gas post-processing device. The duct 42 is a second guide member that guides at least portion of the air from the air blowing device in a second direction, and leads the air to a second portion of the exhaust gas post-processing device. Accordingly, the plurality of portions (the first portion and the second portion) of the exhaust gas post-processing device 30 is cooled by the air S2 led by the inclined plate 41 and the air S1 led by the duct 42. Since each of the portions of the exhaust gas post-processing device 30 is cooled at the same time, the exhaust gas post-processing device 30 is efficiently cooled. As a result, the influence of the heat generated in the exhaust gas post-processing device 30 can be reduced.

In the dump truck 1 according to the present embodiment, the exhaust gas post-processing device 30 is disposed above the engine 11. In addition, the first guide member is disposed in front of the exhaust gas post-processing device 30, and includes the inclined plate 41 that lifts and guides the air to the upper side and leads the air to the exhaust gas post-processing device 30. Therefore, the air that flows from the front side of the exhaust gas post-processing device 30 can be efficiently led to the exhaust gas post-processing device 30.

In the dump truck 1 according to the present embodiment, the exhaust gas post-processing device 30 is disposed behind the engine 11. In addition, the second guide member is disposed between the exhaust gas post-processing device 30 and the air blowing device, and includes the duct 42 that, after guiding the air to the side, guides the air to the rear side, and leads it to the exhaust gas post-processing device 30. Therefore, the air can be guided more reliably to the side of the exhaust gas post-processing device 30.

In the dump truck 1 according to the present embodiment, the exhaust gas post-processing device 30 has the containers 31A and 33A through which exhaust gas flows, and the sensors 31C and 33C disposed on the side surfaces of the containers 31A and 33A, respectively. In addition, the first portion and the second portion include the sensors 31C and 33C, respectively. Therefore, according to the present embodiment, the sensors 31C and 33C can be efficiently cooled.

The dump truck 1 according to the present embodiment can efficiently cool the sensor 31C disposed on the side surface of container 31A of the DPF device 31, and the sensor 31C disposed on the side surface of the container 33A of the SCR device 33.

In the dump truck 1 according to the present embodiment, the containers 31A and 33A are disposed in the left-right direction (Y axis direction) of the vehicle main body 2 in a state where the side surfaces face each other, the sensor 31A is disposed on a portion of the side surface of the container 31A so as not to face the container 33A, and the sensor 33C is disposed on a portion of the side surface of the container 33A so as not to face the container 31A. In other words, the sensors 31A and 33A are disposed away from a facing portion where the heat between the containers 31A and 33A tends to accumulate. Therefore, the influence of heat on the sensors 31A and 33A can be suppressed, and the sensors 31A and 33A can be efficiently cooled.

The dump truck 1 according to the present embodiment further includes the supercharger 12 provided in the engine 11, and the first guide member 41 is disposed at a position that covers the upper side of the supercharger 12. Therefore, the entering of liquid such as rain water from the upper side (+Z side) of the supercharger 12 is suppressed and thus, the water-tightness of the supercharger 12 can be ensured.

Furthermore, the dump truck 1 according to the present embodiment includes the supply pipe 32E through which the exhaust gas post-processing device 30 flows the reducing agent. In addition, the guide device is the second guide device 50 that lifts and leads the air from the air blowing device to the supply pipe 32E. Therefore, the second guide device 50, which has a function to hold the container-between portion 32G and the container-between portion 32G of the supply pipe 32E, is cooled by the air S3 led by the second guide device 50. As a result, the influence of the heat, which is generated in the exhaust gas post-processing device 30, on the supply pipe 32E can be reduced.

In the dump truck 1 according to the present embodiment, the second guide device 50 is provided along the supply pipe 32E, and has the holder 58 that holds the supply pipe 32E. Therefore, the supply pipe 32E is stably held and thus, for example, the contact of the supply pipe 32E with the front surface portion 51 and the side surface portions 52 and 53 of the second guide device 50 can be suppressed.

In the dump truck 1 according to the present embodiment, the space portion K is disposed below the exhaust gas post-processing device 30, and the second guide device 50 has the air intake portion 57 continuously connected to the space portion K. Therefore, it becomes possible to lift and flow the air taken in from the air intake portion 57 to the upper side (+Z side) along the container-between portion 32G.

In the dump truck 1 according to the present embodiment, the supply pipe 32E has the container-between portion 32G disposed between the containers 31A and 33A, and the second guide device 50 is disposed so as to cover the container-between portion 32G. Therefore, the heat radiated from the DPF device 31 and the SCR device 33 can be shielded.

Technical scope of the present invention is not limited to the embodiment described above but can be modified as appropriate without departing from the spirit and scope of the present invention. For example, in the embodiment described above, the example of the inclined plate 41 being disposed at the position that covers the upper side of the supercharger 12 has been described; however, the present invention is not limited to this, and the inclined plate 41 may be disposed at a position that does not cover the upper side of the supercharger 12.

REFERENCE SIGNS LIST

H Virtual plane
K Space portion
S1, S2, S3 Air
1 Dump truck
2 Vehicle main body
3 Vessel
3A Exhaust gas inflow port
4 Traveling device
5 Vehicle body
5A Lower deck
5B Upper deck
5C, 5D Ladder
5F Main frame
5G Cross frame
5H Bottom plate
6 Wheel
6F Front wheel
6R Rear wheel
7, 7F, 7R Axle
8 Cab
9 Platform
9A Inspection port
10 Power generation device
11 Engine
11A Main body portion
11B Intake pipe
11C Exhaust pipe
12 Supercharger
12A Exhaust turbine
12B Compressor
13 Fuel tank
20 Cooling device
21 Radiator
22 Air blowing device
22A Fan
30 Exhaust gas post-processing device
31 DPF device
31A, 33A Container
31B Filter
31C, 33C Sensor
32 Mixing device
32A Upstream side elbow pipe
32B Straight pipe
32C Downstream side elbow pipe
32D Urea water tank
32E Supply pipe
32F Injector
32G Container-between portion
33 SCR device
33B Reduction catalyst
34 Connection pipe
35 Cover member
35A, 44E, 54 Upper surface portion
35B, 44C, 51 Front surface portion
35C, 43A, 44D Rear surface portion
35D, 35E, 41D, 43C, 43D, 44B, 52, 53 Side surface portion
35F, 35G Slit
40 First guide device
41 Inclined plate
41A Fixing portion
41B Inclined portion
41C, 43B, 44A Bottom surface portion
41E Edge portion
41F, 43F, 54A Cutout portion
42 Duct
43 Air intake member
43E Upper connecting portion
43G Stepped portion
44 Side guide member
44F Opening portion
44G Guide plate
50 Second guide device
51A, 53A First surface
51B, 53B Second surface
55, 56 Fixing piece 57 Air intake portion
58 Holder

The invention claimed is:

1. A working vehicle comprising:
an engine;
an air blowing device disposed in front of the engine;
a combustion exhaust gas post-processing device that processes combustion exhaust gas from the engine, and is disposed above the engine, the combustion exhaust gas post-processing device having a front side and a rear side; and
a guide device that lifts and guides at least portion of air from the air blowing device to an upper side in which the combustion exhaust gas post-processing device is provided,
wherein the guide device is disposed between the air blowing device and the combustion exhaust gas post-processing device, and
wherein the guide device includes a first guide member including an inclined plate disposed at the front side of the combustion exhaust gas post-processing device, the inclined plate guiding at least portion of air from the air blowing device in a first direction from the front side to the rear side and leading the at least portion of the air to a first portion of the combustion exhaust gas post-processing device, and a second guide member including a duct disposed at the front side of the combustion exhaust gas post-processing device, the duct guiding at least portion of air from the air blowing device in a second direction substantially perpendicular to the first direction and then bending toward the rear side and leading the at least portion of the air to a second portion of the combustion exhaust gas post-processing device, and
wherein the air blowing device includes a fan, and
wherein the guide device includes a portion where the first guide member and the second guide member are disposed in an area through which air that flows from the fan flows toward the combustion exhaust gas post-processing device.

2. The working vehicle according to claim 1, wherein the combustion exhaust gas post-processing device is disposed behind the engine, and
the second guide member is disposed between the combustion exhaust gas post-processing device and the air blowing device, and includes a duct that, after guiding the air to a side, guides the air to a rear side and leads the air to the combustion exhaust gas post-processing device.

3. The working vehicle according to claim 1, wherein the combustion exhaust gas post-processing device has a container through which the combustion exhaust gas flows, and a detecting unit disposed on a side surface of the container, and
the first portion and the second portion include the detecting unit.

4. The working vehicle according to claim 3, wherein the container has a first container which has a filter that removes fine particles included in the combustion exhaust gas, and a second container which has a catalyst that reduces a nitrogen oxide included in the combustion exhaust gas from which the fine particles have been removed,
the detecting unit has a first detecting unit disposed in the first container, and a second detecting unit disposed in the second container,
the first portion includes the first detecting unit, and
the second portion includes the second detecting unit.

5. The working vehicle according to claim 4, wherein the first container and the second container are disposed side by side in a vehicle width direction of the vehicle main body in a state where side surfaces of the first container and the second container face each other,
the first detecting unit is disposed on a portion, which is different from a portion facing the second container, of a side surface of the first container, and
the second detecting unit is disposed on a portion, which is different from a portion facing the first container, of a side surface of the second container.

6. The working vehicle according to claim 1, wherein the combustion exhaust gas post-processing device includes a supply pipe through which the a reducing agent flows, and
the guide device is a second guide device that lifts and leads the air from the air blowing device to the supply pipe.

7. The working vehicle according to claim 6, wherein the second guide device is provided along the supply pipe, and has a holder that holds the supply pipe.

8. The working vehicle according to claim 6, wherein a space portion is disposed below the combustion exhaust gas post-processing device, and
the second guide device has an air intake portion continuously connected to the space portion.

9. The working vehicle according to claim 6, wherein the combustion exhaust gas post-processing device has a first container which has a filter that removes fine particles included in the combustion exhaust gas, and a second container which has a catalyst that reduces a nitrogen oxide included in the combustion exhaust gas from which the fine particles have been removed,
the supply pipe has a container-between portion disposed between the first container and the second container, and
the second guide device is disposed so as to cover the container-between portion of the supply pipe.

* * * * *